United States Patent
Dembski

(10) Patent No.: US 12,436,086 B2
(45) Date of Patent: Oct. 7, 2025

(54) FLOW CYTOMETERS INCLUDING FIBER OPTIC LIGHT COLLECTORS, AND METHODS OF USE THEREOF

(71) Applicant: Becton, Dickinson and Company, Franklin Lakes, NJ (US)

(72) Inventor: Kyle Dembski, Scotts Valley, CA (US)

(73) Assignee: BECTON, DICKINSON AND COMPANY, Franklin Lakes, NJ (US)

( * ) Notice: Subject to any disclaimer, the term of this patent is extended or adjusted under 35 U.S.C. 154(b) by 328 days.

(21) Appl. No.: 17/577,639

(22) Filed: Jan. 18, 2022

(65) Prior Publication Data

US 2022/0236165 A1      Jul. 28, 2022

Related U.S. Application Data

(60) Provisional application No. 63/142,359, filed on Jan. 27, 2021.

(51) Int. Cl.
G01N 15/1434 (2024.01)
G01N 15/10 (2006.01)

(52) U.S. Cl.
CPC . *G01N 15/1434* (2013.01); *G01N 2015/1006* (2013.01)

(58) Field of Classification Search
None
See application file for complete search history.

(56) References Cited

U.S. PATENT DOCUMENTS

| | | | | |
|---|---|---|---|---|
| 5,134,426 A | * | 7/1992 | Kataoka | G11B 7/1398 |
| 5,231,463 A | * | 7/1993 | Shambaugh | G01F 1/76 356/336 |
| 5,475,487 A | * | 12/1995 | Mariella, Jr. | G02B 6/262 356/336 |
| 5,483,469 A | * | 1/1996 | Van den Engh | G01N 15/14 356/336 |
| 5,674,743 A | * | 10/1997 | Ulmer | B01L 3/502776 436/172 |
| 6,097,485 A | * | 8/2000 | Lievan | G01N 21/645 356/73 |
| 6,139,800 A | * | 10/2000 | Chandler | G01N 15/1456 422/82.08 |

(Continued)

FOREIGN PATENT DOCUMENTS

| | | | |
|---|---|---|---|
| CN | 110146430 A | 8/2019 | |
| EP | 1365261 B1 * | 12/2016 | G01T 1/2002 |
| WO | WO2013181453 A2 | 12/2013 | |

*Primary Examiner* — David P Porta
*Assistant Examiner* — Djura Malevic
(74) *Attorney, Agent, or Firm* — Nicholas D. Cervenka; Bret E. Field; BOZICEVIC, FIELD & FRANCIS LLP

(57) ABSTRACT

Flow cytometers having fiber optic light collectors are provided. Aspects of the subject flow cytometers involve a flow cell configured to transport particles in a core stream, a light source configured to produce a beam for irradiating the particles in the core stream and a fiber optic light collector for receiving particle-modulated light from the irradiated particles and conveying collected light to a detector. In some cases, the fiber optic light collector is optically aligned to the core stream and includes a collection surface having opposing edges running parallel to the direction of the core stream. Methods of analyzing a sample are also provided.

18 Claims, 8 Drawing Sheets

(56) References Cited

U.S. PATENT DOCUMENTS

| | | | | |
|---|---|---|---|---|
| 7,324,724 | B2* | 1/2008 | Levesque | H01S 3/0675 385/73 |
| 7,511,285 | B2* | 3/2009 | Bernstein | B82Y 30/00 250/461.2 |
| 7,639,909 | B2* | 12/2009 | Murshid | G02B 6/262 385/38 |
| 7,709,821 | B2* | 5/2010 | Casstevens | G01N 15/1433 250/573 |
| 8,220,494 | B2* | 7/2012 | Studer | F15C 1/06 137/833 |
| 8,303,894 | B2* | 11/2012 | Rich | G01N 15/06 137/15.01 |
| 8,323,564 | B2* | 12/2012 | Padmanabhan | B01L 3/502715 422/63 |
| 8,432,541 | B2* | 4/2013 | Rich | G01N 15/1434 356/73 |
| 8,445,286 | B2* | 5/2013 | Bair | G01N 15/1404 137/15.04 |
| 8,507,279 | B2* | 8/2013 | Ball | G01N 33/5094 422/62 |
| 8,536,542 | B2* | 9/2013 | Fortin | G01N 21/51 385/39 |
| 8,605,283 | B2* | 12/2013 | Ilkov | G01N 15/1459 356/440 |
| 8,692,993 | B2* | 4/2014 | Mendele | G01N 15/1404 436/63 |
| 8,715,573 | B2* | 5/2014 | Ball | G01N 15/1404 422/68.1 |
| 8,735,828 | B2* | 5/2014 | Beddar | A61N 5/1048 600/407 |
| 8,828,320 | B2* | 9/2014 | Bardell | G01N 35/00603 422/68.1 |
| 8,936,762 | B2* | 1/2015 | Ehrlich | G01N 15/14 422/68.1 |
| 8,941,062 | B2* | 1/2015 | Wagner | G01N 15/1492 250/338.5 |
| 9,280,635 | B2* | 3/2016 | Rich | G01J 3/18 |
| 9,453,791 | B2* | 9/2016 | Schreuder | G01N 15/1436 |
| 9,551,600 | B2* | 1/2017 | Howes | G01F 1/00 |
| 9,581,491 | B2* | 2/2017 | DiCesare | G01N 21/645 |
| 9,696,257 | B2* | 7/2017 | Fox | G01N 15/1427 |
| 9,907,980 | B2* | 3/2018 | Beddar | A61N 5/1071 |
| 10,127,940 | B1* | 11/2018 | Wessel | G11B 7/13 |
| 10,180,390 | B2* | 1/2019 | Schreuder | G01N 21/05 |
| 10,184,879 | B2* | 1/2019 | Cao | G01N 15/1459 |
| 10,359,354 | B2* | 7/2019 | Fortin | G01N 21/53 |
| 10,429,387 | B2* | 10/2019 | Beck | G01N 33/582 |
| 10,585,028 | B2* | 3/2020 | Calvin | G01N 15/1436 |
| 10,605,713 | B2* | 3/2020 | Petersen | G01N 15/14 |
| 10,677,709 | B2* | 6/2020 | Dixon | G01N 21/0303 |
| 10,788,411 | B2* | 9/2020 | Yan | G02B 5/3083 |
| 11,027,278 | B2* | 6/2021 | Gilbert | F16K 99/0019 |
| 11,099,066 | B2* | 8/2021 | Wu | H01L 31/02005 |
| 11,105,728 | B2* | 8/2021 | Diebold | G01N 15/1429 |
| 11,181,464 | B2* | 11/2021 | Petersen | G01N 15/1429 |
| 11,346,762 | B2* | 5/2022 | Osborne | G01N 15/1434 |
| 11,530,976 | B2* | 12/2022 | Krausz | G01N 15/1459 |
| 12,072,277 | B2* | 8/2024 | Cooksey | G01N 21/53 |
| 2003/0054558 | A1* | 3/2003 | Kurabayashi | G01N 33/491 436/63 |
| 2003/0096302 | A1* | 5/2003 | Yguerabide | G01N 21/47 435/7.1 |
| 2004/0080744 | A1* | 4/2004 | Hobbs | G01N 21/05 356/246 |
| 2006/0013270 | A1* | 1/2006 | Yumoto | G02F 1/3775 372/21 |
| 2006/0273260 | A1* | 12/2006 | Casstevens | G01J 3/0218 250/458.1 |
| 2007/0047868 | A1* | 3/2007 | Beaulieu | G01N 15/147 385/12 |
| 2008/0010821 | A1* | 1/2008 | Padmanabhan | G01F 1/6842 29/842 |
| 2008/0277595 | A1* | 11/2008 | Lundquist | G01N 27/44721 250/458.1 |
| 2009/0015831 | A1* | 1/2009 | Yguerabide | G01N 21/47 356/337 |
| 2009/0155832 | A1* | 6/2009 | Lo | B01L 3/502715 29/829 |
| 2010/0167413 | A1* | 7/2010 | Lundquist | G01N 27/44721 436/172 |
| 2010/0220315 | A1* | 9/2010 | Morrell | G01N 15/1436 356/73 |
| 2010/0277722 | A1* | 11/2010 | Kraiczek | B81C 1/00071 204/461 |
| 2011/0256523 | A1* | 10/2011 | Mendele | G01N 15/1404 435/286.2 |
| 2011/0291025 | A1* | 12/2011 | Fortin | G01N 15/1459 356/442 |
| 2012/0078531 | A1* | 3/2012 | Lo | G01N 15/1434 702/21 |
| 2012/0220022 | A1* | 8/2012 | Ehrlich | G01N 15/14 435/286.2 |
| 2012/0252704 | A1* | 10/2012 | Jaffe | G01N 21/255 422/82.08 |
| 2012/0307244 | A1* | 12/2012 | Sharpe | G01N 15/1459 250/573 |
| 2013/0315447 | A1* | 11/2013 | Sieracki | G06V 10/147 382/107 |
| 2013/0342837 | A1* | 12/2013 | Chandonnet | G01N 15/1459 356/337 |
| 2014/0320861 | A1* | 10/2014 | van den Engh | G01N 21/85 356/440 |
| 2016/0238511 | A1* | 8/2016 | Cao | G01N 15/1459 |
| 2016/0290915 | A1* | 10/2016 | Chen | G01N 15/1434 |
| 2016/0320288 | A1* | 11/2016 | Fortin | G01N 21/6428 |
| 2018/0000351 | A1* | 1/2018 | Zharov | G01N 15/1434 |
| 2018/0095022 | A1* | 4/2018 | Petersen | G01N 15/14 |
| 2019/0113434 | A1* | 4/2019 | Cao | G01N 15/1434 |
| 2019/0226975 | A1* | 7/2019 | Osborne | G01N 15/1434 |
| 2019/0383725 | A1* | 12/2019 | Petersen | G01N 15/1459 |
| 2020/0003615 | A1* | 1/2020 | Wu | G01N 15/1012 |
| 2020/0278285 | A1* | 9/2020 | Berzofsky | G01N 15/1459 |
| 2020/0333612 | A1* | 10/2020 | Manassen | G02B 27/0977 |
| 2021/0033521 | A1* | 2/2021 | Svarcz | G01N 15/1459 |
| 2021/0055201 | A1* | 2/2021 | Cooksey | G01N 15/1429 |
| 2022/0146401 | A1* | 5/2022 | Yamamoto | G01N 15/1429 |
| 2022/0236165 | A1* | 7/2022 | Dembski | G01N 15/1434 |
| 2024/0310269 | A1* | 9/2024 | Cooksey | G01N 15/1429 |
| 2024/0371184 | A1* | 11/2024 | Comiter | G06N 3/0475 |

* cited by examiner

FLOW CYTOMETERS INCLUDING FIBER OPTIC LIGHT COLLECTORS, AND METHODS OF USE THEREOF

CROSS-REFERENCE

Pursuant to 35 U.S.C. § 119 (e), this application claims priority to the filing date of U.S. Provisional Patent Application Ser. No. 63/142,359 filed Jan. 27, 2021; the disclosures of which applications are incorporated herein by reference in their entirety.

INTRODUCTION

The characterization of analytes in biological fluids has become an important part of biological research, medical diagnoses and assessments of overall health and wellness of a patient. Detecting analytes in biological fluids, such as human blood or blood derived products, can provide results that may play a role in determining a treatment protocol of a patient having a variety of disease conditions.

Flow cytometry is a technique used to characterize and often times sort biological material, such as cells of a blood sample or particles of interest in another type of biological or chemical sample. A flow cytometer typically includes a sample reservoir for receiving a fluid sample, such as a blood sample, and a sheath reservoir containing a sheath fluid. The flow cytometer transports the particles (including cells) in the fluid sample as a cell stream to a flow cell, while also directing the sheath fluid to the flow cell. To characterize the components of the flow stream, the flow stream is irradiated with light. Variations in the materials in the flow stream, such as morphologies or the presence of fluorescent labels, may cause variations in the observed light and these variations allow for characterization and separation. To characterize the components in the flow stream, light must impinge on the flow stream and be collected. Light sources in flow cytometers can vary and may include one or more broad spectrum lamps, light emitting diodes as well as single wavelength lasers. The light source is aligned with the flow stream and an optical response from the illuminated particles is collected and quantified.

The parameters measured using a flow cytometer typically include light at the excitation wavelength scattered by the particle in a narrow angle along a mostly forward direction, referred to as forward-scatter (FSC), the excitation light that is scattered by the particle in an orthogonal direction to the excitation laser, referred to as side-scatter (SSC), and the light emitted from fluorescent molecules in one or more detectors that measure signal over a range of spectral wavelengths, or by the fluorescent dye that is primarily detected in that specific detector or array of detectors. Different cell types can be identified by their light scatter characteristics and fluorescence emissions resulting from labeling various cell proteins or other constituents with fluorescent dye-labeled antibodies or other fluorescent probes.

In some flow cytometric systems, fiber optic elements are included to collect scattered and fluorescent light from the flow cell. After light is collected, the collection fibers convey the scattered and fluorescent light to one or more detectors. In typical flow cytometric systems, the collection fibers possess an essentially circular collection surface, i.e., they are circular fibers. For example, FIG. 1 depicts a typical light collection system having a circular collection fiber. Laser beams 101 irradiate the flow cell (cuvette 102) having a flow channel 103 and core stream 104. Resulting scattered and fluorescent light is collected by circular collection fiber 105.

SUMMARY

The inventor has realized that conventional light collection systems having multiple lasers and circular fibers such as the those depicted in FIG. 1 may result in strict tolerances (i.e., low acceptable variation) with respect to the dimensions and positioning of the laser beams relative to the flow cell and circular collection fiber. In multiplexed systems (i.e., in which multiple lasers are spatially separated but aligned to a single fiber), for example, the lasers that are first and last in the multiplexing sequence exhibit strict fluidic tolerances due to the curvature of the fiber. In other words, when scattered and fluorescent light is collected closer to the perimeter rather than center of the circular collection fiber, a reduction in available collection area is observed. Because analyzed particles often vary in size (e.g., from <1-20 µm) and light emitted from spatially separated lasers may be collected at multiple locations within the collection area of the circular fiber, light collection at the center of the fiber may not be achieved, potentially resulting in a reduction of collected signal. Because conventional particle analysis approaches result in strict fluidic tolerances and reduction of collected signal when multiple lasers are aligned to a single collection fiber, the inventor has further realized that systems and methods for enhancing the collection of particle-modulated light are consequently desirable. Embodiments of the invention satisfy this desire.

Aspects of the invention include flow cytometers having a flow cell configured to transport particles in a core stream, a light source configured to produce a beam for irradiating the particles in the core stream, and a fiber optic light collector for receiving particle-modulated light from the irradiated particles. In some embodiments, the fiber optic light collector is optically aligned to the core stream and includes a collection surface having opposing edges running parallel to the direction of the core stream. In some cases, the collection surface of the fiber optic light collector further includes opposing edges that run perpendicular to the direction of the core stream. Accordingly, in some instances, the collection surface of the subject fiber optic light collector is rectangular. In other instances, the collection surface of the fiber optic light collector is square. Additional embodiments of the invention include an objective lens positioned between the flow cell and the fiber optic light collector that is configured to focus particle-modulated light emitting from the irradiated particles in the core stream. In such embodiments, flow cytometers of interest may also include a refractive optical element (e.g., a prism) positioned between the objective lens and the fiber optic light collector that is configured to direct objective lens focused light onto the collection surface of the fiber optic light collector. In some cases, the light source includes a laser. In other cases, the light source includes a plurality of lasers. Where the light source includes a plurality of lasers, embodiments of the invention also include a single fiber optic light conveyor configured to convey light from each of the plurality of lasers to the flow cell. Flow cytometers may further include a detection module for detecting particle-modulated light emitting from the particles in the core stream. In some embodiments the detection module is configured to demultiplex light collected by the fiber optic light collector and includes one or more fluorescent light detectors, forward-scattered light detectors and side-scattered light detectors.

Aspects of the invention also include methods of analyzing a sample in a flow cytometer having a flow cell configured to transport particles in a core stream, a light source configured to produce a beam for irradiating the particles in the core stream, and a fiber optic light collector for receiving particle-modulated light from the irradiated particles. In some embodiments, the fiber optic light collector is optically aligned to the core stream and includes a collection surface having opposing edges running parallel to the direction of the core stream. In some cases, the collection surface of the fiber optic light collector further includes opposing edges that run perpendicular to the direction of the core stream. Accordingly, in some instances, the collection surface of the subject fiber optic light collector is rectangular. In other instances, the collection surface of the fiber optic light collector is square. Additional embodiments of the methods include focusing particle-modulated light emitting from the irradiated particles in the core stream via an objective lens positioned between the flow cell and the fiber optic light collector. In such embodiments, methods of interest may also include directing objective lens focused light onto the collection surface of the fiber optic light collector via a refractive optical element (e.g., a prism) positioned between the objective lens and the fiber optic light collector. In some cases, the light source includes a laser. In other cases, the light source includes a plurality of lasers. Where the light source includes a plurality of lasers, methods may also include the use of a single fiber optic light conveyor configured to convey light from each of the plurality of lasers to the flow cell. Methods may further include detecting particle-modulated light emitting from the particles in the core stream with a detection module. In some embodiments the detection module is configured to demultiplex light collected by the fiber optic light collector.

Methods of assembling a flow cytometer having a fiber optic light collector are also provided. In embodiments, methods include positioning a fiber optic light collector within a flow cytometer and optically aligning the fiber optic light collector and the core stream such that particle-modulated light is collected.

BRIEF DESCRIPTION OF THE FIGURES

The invention may be best understood from the following detailed description when read in conjunction with the accompanying drawings. Included in the drawings are the following figures.

DETAILED DESCRIPTION

Figure 1:
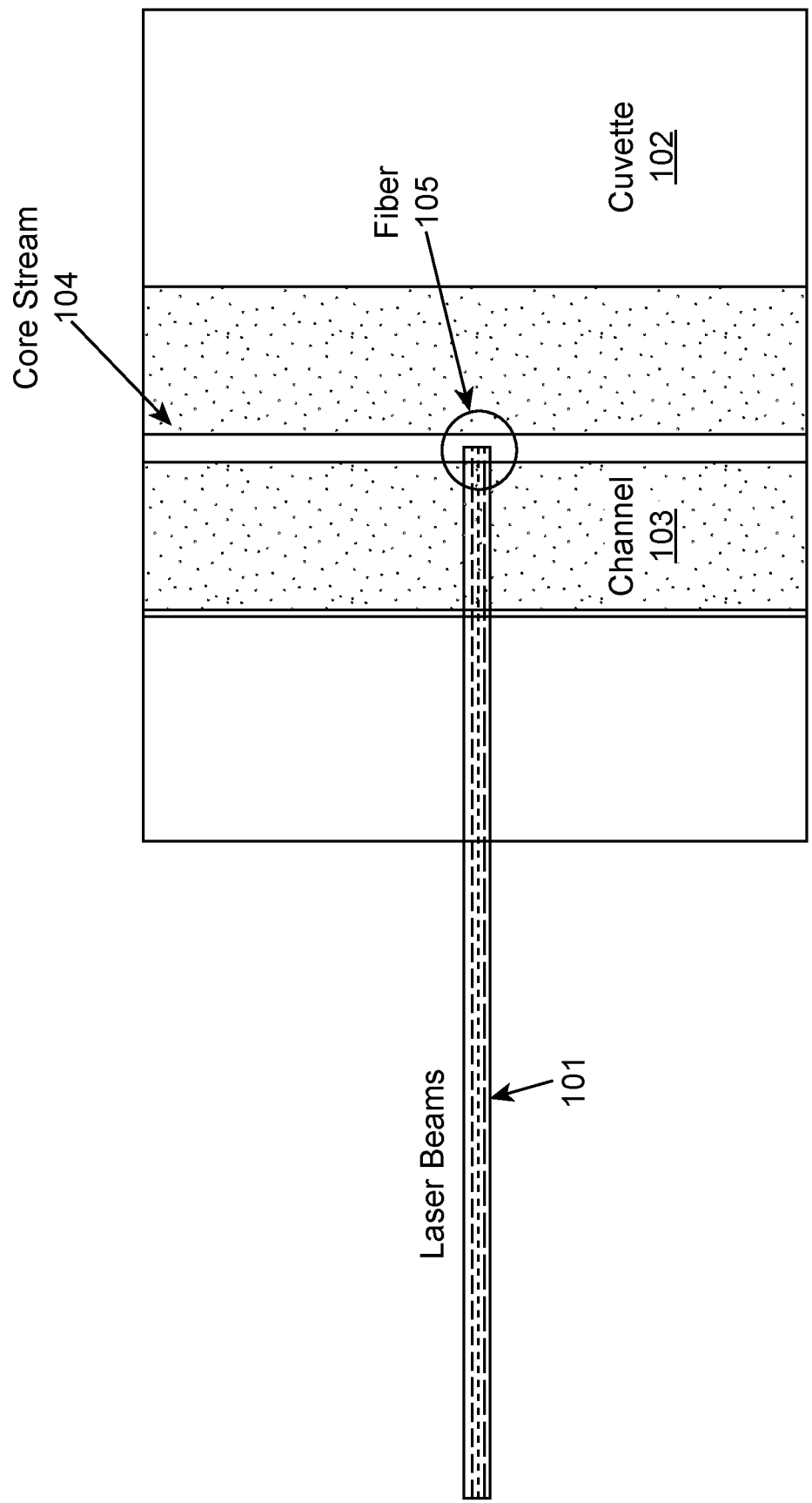
FIG. 1 depicts a conventional light collection system having a circular collection fiber.

Flow cytometers having fiber optic light collectors are provided. Aspects of the subject flow cytometers involve a flow cell configured to transport particles in a core stream, a light source configured to produce a beam for irradiating the particles in the core stream and a fiber optic light collector for receiving particle-modulated light from the irradiated particles and conveying collected light to a detector. In some cases, the fiber optic light collector is optically aligned to the core stream and includes a collection surface having opposing edges running parallel to the direction of the core stream. Methods of analyzing a sample are also provided.

Before the present invention is described in greater detail, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

While the apparatus and method has or will be described for the sake of grammatical fluidity with functional explanations, it is to be expressly understood that the claims, unless expressly formulated under 35 U.S.C. § 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 U.S.C. § 112 are to be accorded full statutory equivalents under 35 U.S.C. § 112.

Flow Cytometers Including Fiber Optic Light Collectors

As described above, aspects of the invention include flow cytometers having a flow cell for transporting particles in a core stream, a light source configured to produce a beam for irradiating the particles in the core stream, and a fiber optic light collector for receiving particle-modulated light from the irradiated particles and conveying collected light to a detector. In embodiments, the fiber optic light collector is optically aligned to the core stream and comprises a collection surface having opposing edges running parallel to the direction of the core stream. Collection of particle-modulated light via the subject fiber optic light collector may, for instance, improve the fluidic tolerances of one or more lasers by possessing a collection surface having an increased light collection area relative to a circular fiber. In some cases, the matching geometry of the collection surface of the subject fiber optic light collector relative to the core stream permits an increase in the number of lasers that can be implemented in a multiplexed system.

The "core stream" discussed herein is referred to in its conventional sense to describe a portion of a sheath fluid stream (i.e., flow stream) in which particles are transported through the flow cell. In general, particles are transported through the core stream in a single-file manner. The size (e.g., diameter) of the core stream may vary as desired. In some instances, the core stream may possess a diameter that is approximately the same as the diameter of the particles being analyzed. As such, in some cases, the diameter of the core stream ranges from 5 μm to 25 μm, including 10 μm to 20 μm. Core stream diameter may be adjusted in proportion to the pressure applied to the particles as they are injected into the sheath fluid stream. The flow rate of the sheath fluid remains constant. In this manner, particles are injected into the sheath fluid and hydrodynamically focused such that laminar flow is generated and the particles travel along the same axis at approximately the same rate. Because particles in the core stream travel along the same axis, the geometry of the core stream is defined by straight edges.

In addition, by "particle-modulated light", it is meant light that is emitted by the particles in the flow stream following the irradiation of the particles with light from the light source. In some cases, the particle-modulated light is fluorescent light. Fluorescent light may, for example, be emitted by a particle having a fluorochrome after said fluorochrome is irradiated with excitation wavelength light. In other cases, the particle-modulated light is side-scattered light. As discussed herein, side-scattered light refers to light refracted and reflected from the surfaces and internal structures of the particle. In still other cases, the particle-modulated light includes both fluorescent light and side-scattered light. In additional embodiments, the particle-modulated light includes forward-scattered light (i.e., light that travels through or around the particle in mostly a forward direction).

As described herein, a "fiber optic light collector" refers to an elongated structure having a proximal and distal end, where the elongated structure is fabricated from a light transparent material that is configured for transmitting light from the proximal to distal end. Accordingly, the fiber optic light collector collects, at the proximal end, particle-modulated light emitted from particles in the core stream and transmits the light to one or more detectors located at the distal end of the collector. In some embodiments, the transparent material includes a glass material such as, but not limited to, silica (e.g., fused silica). In other embodiments, the transparent material includes a polymeric material. In such embodiments, the transparent material may include one or more materials such as, but not limited to, poly(methylmethacrylate) (PMMA), polystyrene, and poly(perfluorobutenyl vinyl ether) (CYTOP). In some embodiments, the fiber optic light collector is a single-mode fiber. As is understood in the art, a single-mode fiber is an optical fiber that conveys light having one mode at a given time. In other instances, the fiber optic light collector is a multi-mode fiber. In contrast to a single-mode fiber, a multi-mode fiber propagates light having multiple modes at the same time. In some embodiments, flow cytometers include a single fiber optic light collector. In other embodiments, flow cytometers include a plurality of fiber optic light collectors (e.g., 2 or more).

As discussed above, fiber optic light collectors according to embodiments of the invention include a collection surface having opposing edges running parallel to the direction of the core stream. By "opposing" edges, it is meant edges running parallel to one another and existing on opposite sides of the collection surface of the fiber optic light collector. As such, the collection surface of the fiber optic light collector may be defined by straight edges. Put another way, the subject fiber optic light collector is not a circular fiber. By "running parallel" to the core stream, it is meant that the opposing straight edges of the collection surface of the fiber optic light collector run in a parallel direction with respect to the axis along which particles are transported within the core stream. The opposing edges may possess any convenient length. In some cases, the opposing edges running parallel to the direction of the core stream each range from 50 μm to 2000 μm, such as 100 μm to 1000 μm, and including 200 μm to 800 μm. In certain cases, the opposing edges running parallel to the direction of the core stream each range from 100 μm to 1000 μm in length. In additional embodiments, the opposing edges running parallel to the direction of the core stream are each 150 μm in length. Some embodiments of the collection surface may, consequently, be defined by any convenient shape having opposing parallel edges. For example, the collection surface of the fiber optic light collector may be shaped substantially like a rectangle, square, parallelogram, rhombus, trapezoid or the like.

In addition to possessing opposing edges running parallel to the direction of the core stream, fiber optic light collectors of interest may include opposing edges that run perpendicular to the direction of the core stream. By "running perpendicular" to the core stream, it is meant that opposing straight edges of the collection surface of the fiber optic light collector run in a perpendicular direction with respect to the axis along which particles are transported within the core stream. The opposing edges may possess any convenient length. In some cases, the opposing edges running perpendicular to the direction of the core stream each range from 50 μm to 2000 μm, such as 100 μm to 1000 μm, and including 200 μm to 800 μm. In certain cases, the opposing edges running perpendicular to the direction of the core stream each range from 100 μm to 1000 μm in length. In additional embodiments, the opposing edges running perpendicular to the direction of the core stream are each 150 μm in length. In embodiments of the fiber optic light collector collection surface having opposing edges running parallel to the direction of the flow cell and opposing edges running perpendicular to the direction of the flow cell, the collection surface may be defined by any convenient corresponding shape. In some instances, the collection surface of the fiber optic light collector is rectangular. In other instances, the collection surface of the fiber optic light collection element is square. In some embodiments, the collection surface possesses rounded corners. In other embodiments, the collection surface possesses square corners. Examples of optical fibers having opposing edges running parallel to the direction of the core stream and opposing edges running perpendicular to the direction of the core stream that may be adapted for use in the present invention include, but are not limited to, the square-core multimode fiber manufactured by Thorlabs, Inc., the square core fiber manufactured by Fiberguide Industries, Inc., and the rectangular-core fiber manufactured by nLIGHT Corporation. Commercially available square core fibers that may be employed include, but are not limited to: Fiberguide-SSQR (Fiber Series), High OH Content; Thorlabs-P/N FP150QMT, 0.39 NA Square-Core Multimode Optical Fiber); Ceramoptec-Optran NCC, 0.22 NA Silica non-circular core fiber; and the like.

According to aspects of the disclosure, flow cytometers include fiber optic light collectors that are optically aligned to the core stream. A core stream and fiber optic light collector may be described as "optically aligned" when the elements are arranged adjacently to one another such that an optimal amount of light emitting from irradiated particles passing through the core stream is collected and conveyed by the fiber optic light collector. The subject fiber optic light collector may be separated from the flow cell and core stream by any convenient distance. In some embodiments, the fiber optic light collector is separated from the flow cell by a distance ranging from 5 mm to 300 mm, such as 10 mm to 200 mm. In embodiments, optically aligned fiber optic light collectors and core streams are arranged such that the opposing edges of the collection surface are perpendicular and/or parallel with respect to the axis along which particles are transported within the core stream, as appropriate.

As discussed above, collection of particle-modulated light via the subject fiber optic light collector may improve the fluidic tolerances of one or more lasers within the light source by possessing a collection surface having an increased light collection area relative to, e.g., a circular fiber. In some cases, the collection surface of the fiber optic light collector described herein may possess a collection surface having a light collection area that is larger than the collection area of a circular fiber by, for example, 15% or more, 20% or more, 25% or more, 30% or more, 35% or more, 40% or more, 45% or more and including 50% or more. Furthermore, because the subject fiber optic light collector possesses a collection surface having opposing edges running parallel to the direction of the core stream, the matching geometry of the collection surface of the subject fiber optic light collector relative to the core stream further improves tolerances and thereby increases the number of lasers that can be implemented in a multiplexed optical system. In other words, when particle-modulated light is collected closer to the edge rather than the center of the collection surface, the same or a similar amount of light is collected at the edge that would have been collected at the center. This is observed because the collection surface does not possess a perimeter that tapers as one moves laterally from the center of the surface to the boundary (i.e., such as in a circular fiber). Accordingly, flow cytometers according to aspects of the disclosure may effectively include multiple multiplexed lasers, such as 3 or more, 4 or more, 5 or more and including 6 or more multiplexed lasers.

Figure 2:
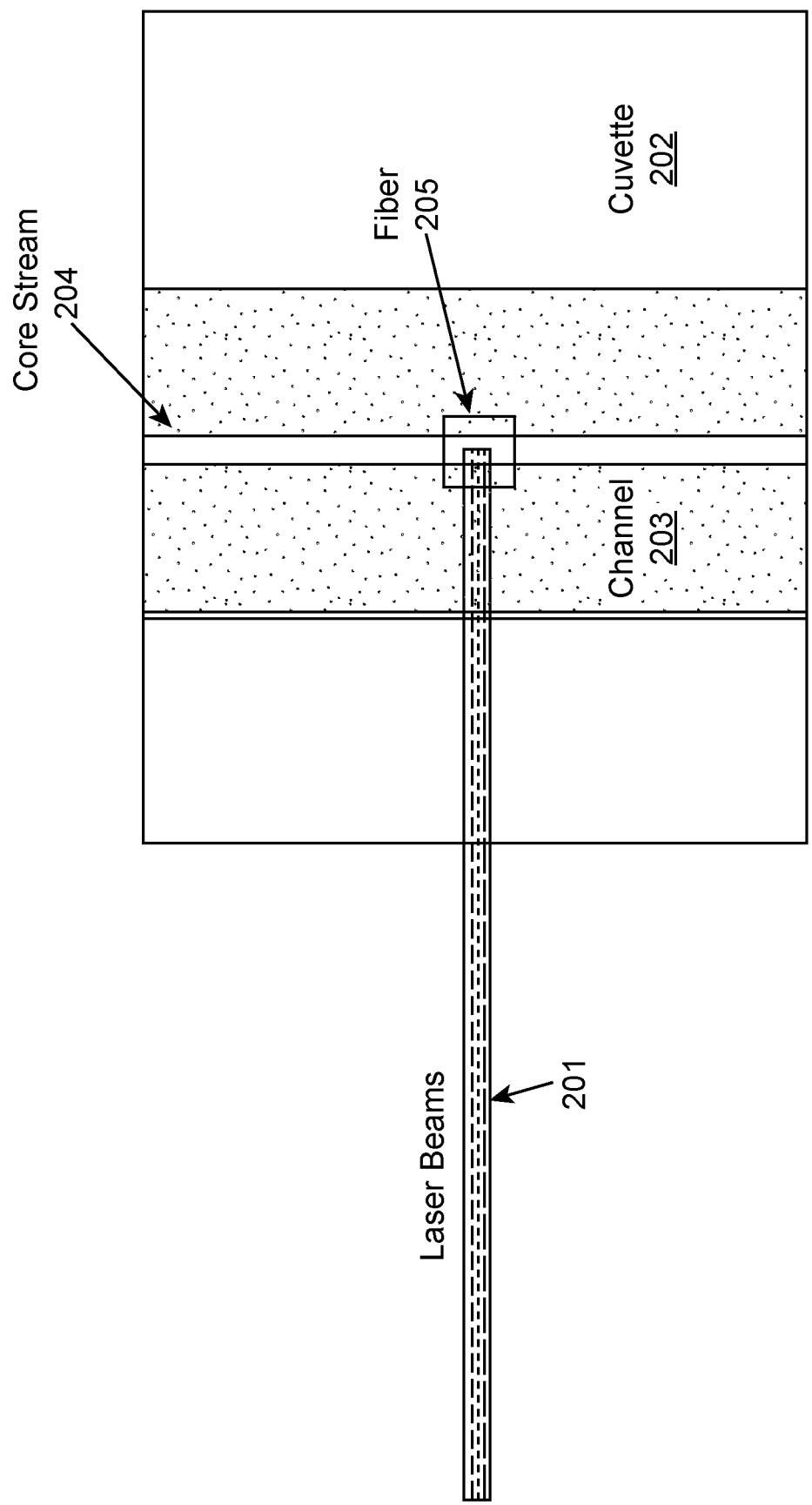
FIG. 2 depicts a light collection system having a fiber optic light collector according to certain embodiments.

FIG. 2 depicts a flow cytometric system having a fiber optic light collector according to certain embodiments. Laser beams 201 irradiate the flow cell (cuvette 202) having a flow channel 203 and core stream 204. Particles passing through core stream 204 emit light that is collected by fiber optic light collector 205. The collection surface of fiber optic light collector 205 in the embodiment depicted in FIG. 2 is square and includes opposing edges running parallel to the direction of the core stream and opposing edges that run perpendicular to the direction of the core stream.

In some embodiments, the subject flow cytometers additionally include an objective lens positioned between the flow cell and the fiber optic light collector. In such embodiments, the objective lens may be configured to focus particle-modulated light from the core stream. Objective lenses of interest for focusing particle-modulated light is may include one or a combination of a collimating lens, a focusing lens, a magnifying lens, a de-magnifying lens, or other lens, that are configured to receive light from a detection zone of a flow cell and produce imaged light that is transmitted to the fiber optic light collector.

In additional embodiments, flow cytometers of interest include a refractive optical element, such as those described in U.S. Provisional Application No. 63/114,230, the disclosure of which is herein incorporated by reference in its entirety. In certain instances, the refractive optical element is positioned between the objective lens and the fiber optic light collector. In some embodiments, the refractive optical element is located 10 mm or less from the fiber optic light collector, such as 5 mm or less, 2 mm or less, 1 mm or less, 0.5 mm or less, 0.1 mm or less, 0.05 mm or less, 0.001 mm and including where the refractive optical element and fiber optic light collector are in physical contact. In such embodiments, the refractive optical element is configured to collect objective lens focused light and project the collected objective lens focused light onto the surface of the fiber optic light collector so that the light may be conveyed to one or more detectors. "Refraction" as discussed herein is described in its conventional sense to refer to light changing its direction after passing through a medium. As such, in embodiments, the refractive optical element is configured to alter the direction of objective lens focused light such that the light propagates along a single optical axis and illuminates the surface of the fiber optic light collector. In some instances, objective lens focused light is collected such that 70% or more of the objective lens focused light illuminates the surface of the fiber optic light collector and is subsequently conveyed to one or more detectors in the detector assembly, such as 80% or more, 90% or more, 95% or more, 97% or more, and including 99% or more of objective lens focused light. In embodiments, refraction by the refractive optical element provides additional optical power for coupling objective lens focused light into the fiber optic light collector.

Any convenient device for refracting and collecting light may be employed as the subject refractive optical element. In some embodiments, the refractive optical element is a prism. The "prism" discussed herein is described in its conventional sense to refer to a transparent optical element configured to refract light. Refractive optical elements of interest may include any suitable shape including but not limited to rectilinear cross sectional shapes, e.g., squares, rectangles, trapezoids, triangles, hexagons, etc., curvilinear cross-sectional shapes, e.g., circles, ovals, etc., as well as irregular shapes, e.g., a parabolic bottom portion coupled to a planar top portion, etc. In other embodiments, the refractive optical element includes a cylindrical lens. In such embodiments, the lens is configured to collect objective lens focused light and project the objective lens focused light onto the surface of the fiber optic light collector.

In some embodiments, the refractive optical element possesses a refractive index that ranges from 1 to 3, such as from 1.1 to 2.9, such as from 1.2 to 2.8, such as from 1.3 to 2.7, such as from 1.4 to 2.6, such as from 1.5 to 2.7, such as from 1.6 to 2.6, such as from 1.7 to 2.5, such as from 1.8 to 2.4 and including from 1.9 to 2.3. Depending on the transparency desired, refractive optical elements of interest may be formed from any suitable material including but not limited to glass (e.g., N-SF10, N-SF11, N-SF57, N-BK7, N-LAK21 or N-LAF35 glass), silica (e.g., fused silica), quartz, crystal (e.g., CaF$_2$ crystal), zinc selenide (ZnSe), F$_2$, germanium (Ge) titanate (e.g., S-TIH11), borosilicate (e.g., BK7). In some embodiments, the refractive optical element has a transparency window of from 150 nm to 5 μm; from 180 nm to 8 μm, from 185 nm to 2.1 μm, from 200 nm to 6 μm, from 200 nm to 11 μm, from 250 nm to 1.6 μm, from 350 nm to 2 μm, from 600 nm to 16 μm, from 1.2 μm to 8 μm, from 2 μm to 16 μm or some other wavelength range.

In some instances, light refracted by the refractive optical element continues to propagate along an axis that is parallel to the optical axis established by the light source. In other embodiments, light refracted by the refractive optical element may propagate along an axis possessing an angle of deviation relative to the optical axis established by the light source. In such embodiments, deviation may range from 0.001 arc minute to 10 arc minute, such as from 0.005 arc minute to 9 arc minute, such as from 0.01 arc minute to 8 arc minute, such as from 0.05 arc minute to 7 arc minute, such as from 0.1 arc minute to 6 arc minute, such as from 0.5 arc minute to 5 arc minute and including from 1 arc minute to 3 arc minute. In some embodiments, the light separation component provides for a beam deviation that is 5 arc minute or less, such as 4 arc minute or less, such as 3 arc minute or less, such as 2 arc minute or less, such as 1 arc minute or less, such as 0.5 arc minute or less, such as 0.1 arc minute or less, such as 0.05 arc minute or less, such as 0.01 arc minute or less, such as 0.005 arc minute or less, such as 0.001 arc minute or less and including providing for a laser beam deviation angle of 0.0001 arc minute or less.

Figure 3:
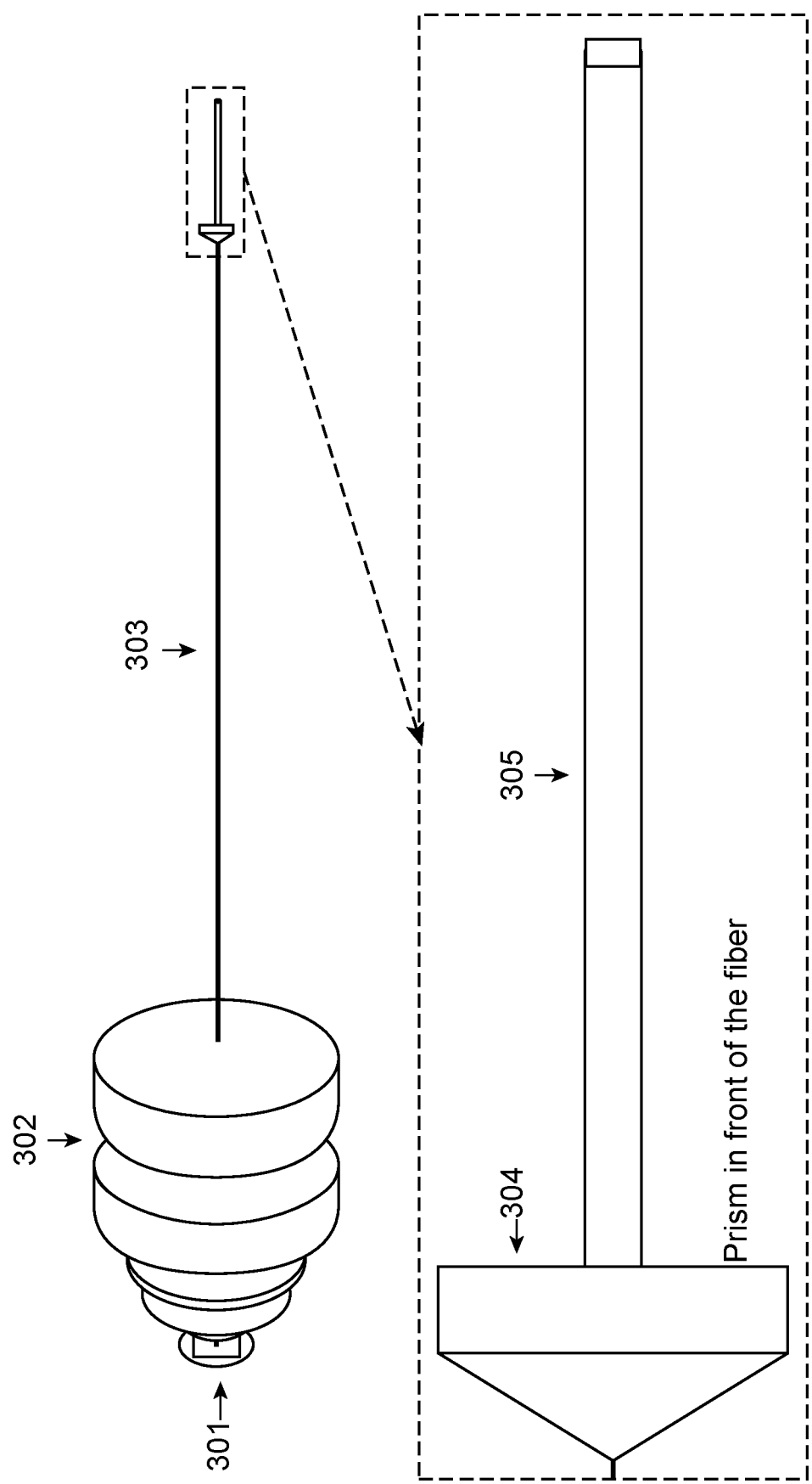
FIG. 3 depicts a light collection system having an objective lens, a refractive optical element and a fiber optic light collector according to certain embodiments.

FIG. 3 depicts a flow cytometric system having an objective lens, a refractive optical element and a fiber optic light collector according to certain embodiments. As shown in FIG. 3, particles passing through flow cell 301 are irradiated by light from a light source (not shown). Particle-modulated light from the flow cell is subsequently focused by objective lens 302 to generate objective lens focused light 303. The objective lens focused light 303 subsequently irradiates a refractive optical element (i.e., prism 304) which collects and projects the objective lens focused light 303 onto the surface of the fiber optic light collector 305.

As discussed above, aspects of the subject flow cytometers include a flow cell configured to propagate particles in a flow stream. Any convenient flow cell which propagates a fluidic sample to a sample interrogation region may be employed, where in some embodiments, the flow cell includes is a cylindrical flow cell, a frustoconical flow cell or a flow cell that includes a proximal cylindrical portion defining a longitudinal axis and a distal frustoconical portion which terminates in a flat surface having the orifice that is transverse to the longitudinal axis.

In some embodiments, the sample flow stream emanates from an orifice at the distal end of the flow cell. Depending on the desired characteristics of the flow stream, the flow cell orifice may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. In certain embodiments, flow cell of interest has a circular orifice. The size of the nozzle orifice may vary, in some embodiments ranging from 1 μm to 10000 μm, such as from 25 μm to 7500 μm, such as from 50 μm to 5000 μm, such as from 75 μm to 1000 μm, such as from 100 μm to 750 μm and including from 150 μm to 500 μm. In certain embodiments, the nozzle orifice is 100 μm.

In some embodiments, the flow cell includes a sample injection port configured to provide a sample to the flow cell. The sample injection port may be an orifice positioned in a wall of the inner chamber or may be a conduit positioned at the proximal end of the inner chamber. Where the sample injection port is an orifice positioned in a wall of the inner chamber, the sample injection port orifice may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, etc., as well as irregular shapes, e.g., a parabolic bottom portion coupled to a planar top portion. In certain embodiments, the sample injection port has a circular orifice. The size of the sample injection port orifice may vary depending on shape, in certain instances, having an opening ranging from 0.1 mm to 5.0 mm, such as 0.2 to 3.0 mm, such as 0.5 mm to 2.5 mm, such as from 0.75 mm to 2.25 mm, such as from 1 mm to 2 mm and including from 1.25 mm to 1.75 mm, for example 1.5 mm.

In certain instances, the sample injection port is a conduit positioned at a proximal end of the flow cell inner chamber. For example, the sample injection port may be a conduit positioned to have the orifice of the sample injection port in line with the flow cell orifice. Where the sample injection port is a conduit positioned in line with the flow cell orifice, the cross-sectional shape of the sample injection tube may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. The orifice of the conduit may vary depending on shape, in certain instances, having an opening ranging from 0.1 mm to 5.0 mm, e.g., 0.2 to 3.0 mm, e.g., 0.5 mm to 2.5 mm, such as from 0.75 mm to 2.25 mm, such as from 1 mm to 2 mm and including from 1.25 mm to 1.75 mm, for example 1.5 mm. The shape of the tip of the sample injection port may be the same or different from the cross-sectional shape of the sample injection tube. For example, the orifice of the sample injection port may include a beveled tip having a bevel angle ranging from 1 degree to 10 degrees, such as from 2 degrees to 9 degrees, such as from 3 degrees to 8 degrees, such as from 4 degrees to 7 degrees and including a bevel angle of 5 degrees.

In some embodiments, the flow cell also includes a sheath fluid injection port configured to provide a sheath fluid to the flow cell. In embodiments, the sheath fluid injection system is configured to provide a flow of sheath fluid to the flow cell inner chamber, for example in conjunction with the sample to produce a laminated flow stream of sheath fluid surrounding the sample flow stream. Depending on the desired characteristics of the flow stream, the rate of sheath fluid conveyed to the flow cell chamber by the may be 25 µL/sec to 2500 µL/sec, such as 50 µL/sec to 1000 µL/sec, and including 75 µL/sec or more to 750 µL/sec.

In some embodiments, the sheath fluid injection port is an orifice positioned in a wall of the inner chamber. The sheath fluid injection port orifice may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. The size of the sample injection port orifice may vary depending on shape, in certain instances, having an opening ranging from 0.1 mm to 5.0 mm, e.g., 0.2 to 3.0 mm, e.g., 0.5 mm to 2.5 mm, such as from 0.75 mm to 2.25 mm, such as from 1 mm to 2 mm and including from 1.25 mm to 1.75 mm, for example 1.5 mm.

In some embodiments, systems further include a pump in fluid communication with the flow cell to propagate the flow stream through the flow cell. Any convenient fluid pump protocol may be employed to control the flow of the flow stream through the flow cell. In certain instances, systems include a peristaltic pump, such as a peristaltic pump having a pulse damper. The pump in the subject systems is configured to convey fluid through the flow cell at a rate suitable for multi-photon counting of light from the sample in the flow stream. For example, the system may include a pump that is configured to flow sample through the flow cell at a rate that ranges from 1 nL/min to 500 nL/min, such as from 1 nL/min to 250 nL/min, such as from 1 nL/min to 100 nL/min, such as from 2 nL/min to 90 nL/min, such as from 3 nL/min to 80 nL/min, such as from 4 nL/min to 70 nL/min, such as from 5 nL/min to 60 nL/min and including from 10 nL/min to 50 nL/min. In certain embodiments, the flow rate of the flow stream is from 5 nL/min to 6 nL/min.

As discussed above, aspects of the invention also include a light source configured to irradiate particles passing through the flow cell at an interrogation point. Any convenient light source may be employed as the light source described herein. In some embodiments, the light source is a laser. In embodiments, the laser may be any convenient laser, such as a continuous wave laser. For example, the laser may be a diode laser, such as an ultraviolet diode laser, a visible diode laser and a near-infrared diode laser. In other embodiments, the laser may be a helium-neon (HeNe) laser. In some instances, the laser is a gas laser, such as a helium-neon laser, argon laser, krypton laser, xenon laser, nitrogen laser, $CO_2$ laser, CO laser, argon-fluorine (ArF) excimer laser, krypton-fluorine (KrF) excimer laser, xenon chloride (XeCl) excimer laser or xenon-fluorine (XeF) excimer laser or a combination thereof. In other instances, the subject flow cytometers include a dye laser, such as a stilbene, coumarin or rhodamine laser. In yet other instances, lasers of interest include a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof. In still other instances, the subject flow cytometers include a solid-state laser, such as a ruby laser, an Nd:YAG laser, NdCrYAG laser, Er:YAG laser, Nd:YLF laser, Nd:YVO$_4$ laser, Nd:YCa$_4$O(BO$_3$)$_3$ laser, Nd:YCOB laser, titanium sapphire laser, thulim YAG laser, ytterbium YAG laser, ytterbium$_2$O$_3$ laser or cerium doped lasers and combinations thereof.

Laser light sources according to certain embodiments may also include one or more optical adjustment components. In certain embodiments, the optical adjustment component is located between the light source and the flow cell, and may include any device that is capable of changing the spatial width of irradiation or some other characteristic of irradiation from the light source, such as for example, irradiation direction, wavelength, beam width, beam intensity and focal spot. Optical adjustment protocols may include any convenient device which adjusts one or more characteristics of the light source, including but not limited to lenses, mirrors, filters, fiber optics, wavelength separators, pinholes, slits, collimating protocols and combinations thereof. In certain embodiments, flow cytometers of interest include one or more focusing lenses. The focusing lens, in one example, may be a de-magnifying lens. In still other embodiments, flow cytometers of interest include fiber optics.

Where the optical adjustment component is configured to move, the optical adjustment component may be configured to be moved continuously or in discrete intervals, such as for example in 0.01 µm or greater increments, such as 0.05 µm or greater, such as 0.1 µm or greater, such as 0.5 µm or greater such as 1 µm or greater, such as 10 µm or greater, such as 100 µm or greater, such as 500 µm or greater, such as 1 mm or greater, such as 5 mm or greater, such as 10 mm or greater and including 25 mm or greater increments.

Any displacement protocol may be employed to move the optical adjustment component structures, such as coupled to a moveable support stage or directly with a motor actuated translation stage, leadscrew translation assembly, geared translation device, such as those employing a stepper motor, servo motor, brushless electric motor, brushed DC motor, micro-step drive motor, high resolution stepper motor, among other types of motors.

The light source may be positioned any suitable distance from the flow cell, such as where the light source and the flow cell are separated by 0.005 mm or more, such as 0.01 mm or more, such as 0.05 mm or more, such as 0.1 mm or more, such as 0.5 mm or more, such as 1 mm or more, such as 5 mm or more, such as 10 mm or more, such as 25 mm or more and including at a distance of 100 mm or more. In addition, the light source may be positioned at any suitable angle to the flow cell, such as at an angle ranging from 10 degrees to 90 degrees, such as from 15 degrees to 85 degrees, such as from 20 degrees to 80 degrees, such as from 25 degrees to 75 degrees and including from 30 degrees to 60 degrees, for example at a 90 degree angle.

In some embodiments, light sources of interest include a plurality of lasers configured to provide laser light for discrete irradiation of the flow stream, such as 2 lasers or more, such as 3 lasers or more, such as 4 lasers or more, such as 5 lasers or more, such as 10 lasers or more, and including 15 lasers or more configured to provide laser light for discrete irradiation of the flow stream. Depending on the desired wavelengths of light for irradiating the flow stream, each laser may have a specific wavelength that varies from 200 nm to 1500 nm, such as from 250 nm to 1250 nm, such as from 300 nm to 1000 nm, such as from 350 nm to 900 nm and including from 400 nm to 800 nm. In certain embodiments, lasers of interest may include one or more of a 405 nm laser, a 488 nm laser, a 561 nm laser and a 635 nm laser.

In certain cases, flow cytometers of interest include a fiber optic light conveyor configured to convey light from each of the plurality of lasers to the flow cell. In such cases, the subject fiber optic light conveyor includes a light transparent material and possesses a proximal end for receiving light from one or more lasers in the plurality of lasers and a distal end for projecting the received light onto the flow cell such that the particles in the core stream are irradiated. In certain instances, flow cytometers of interest include a single fiber optic light conveyor for conveying light from each laser in the plurality of lasers. In such instances, each laser is optically aligned to the same fiber optic light conveyor. In some embodiments, the transparent material includes a glass material such as, but not limited to, silica (e.g., fused silica). In other embodiments, the transparent material includes a polymeric material. In such embodiments, the transparent material may include one or more materials such as, but not limited to, poly(methyl-methacrylate) (PMMA), polystyrene, and (poly(perfluoro-butenyl vinyl ether) (CYTOP). In some embodiments, the fiber optic light conveyor is a single-mode fiber. In other instances, the fiber optic light conveyor is a multi-mode fiber.

Where more than one laser is employed, the sample may be irradiated with the lasers simultaneously or sequentially, or a combination thereof. For example, the sample may be simultaneously irradiated with each of the lasers. In other embodiments, the flow stream is sequentially irradiated with each of the lasers. As such, in some embodiments of the invention including multiple lasers, the light source may be configured to irradiate the sample with multiplexed beams. Any convenient multiplexing method may be employed. For example, the lasers may be configured to produce time-multiplexed beams. "Time-multiplexing" is referred to in its conventional sense to describe transmitting independent signals over a common signal path such that each signal is only transmitted over a fraction of time in an alternating pattern. In some embodiments of the invention that include a plurality of multiplexed lasers, a single fiber optic light conveyor may be provided to convey multiplexed beams from the plurality of is lasers to the flow cell.

Where more than one light source is employed to irradiate the sample sequentially, the time each light source irradiates the sample may independently be 0.001 microseconds or more, such as 0.01 microseconds or more, such as 0.1 microseconds or more, such as 1 microsecond or more, such as 5 microseconds or more, such as 10 microseconds or more, such as 30 microseconds or more and including 60 microseconds or more. For example, methods may include irradiating the sample with the light source (e.g. laser) for a duration which ranges from 0.001 microseconds to 100 microseconds, such as from 0.01 microseconds to 75 microseconds, such as from 0.1 microseconds to 50 microseconds, such as from 1 microsecond to 25 microseconds and including from 5 microseconds to 10 microseconds. In embodiments where sample is sequentially irradiated with two or more light sources, the duration sample is irradiated by each light source may be the same or different.

The time period between irradiation by each laser may also vary, as desired, being separated independently by a delay of 0.001 microseconds or more, such as 0.01 microseconds or more, such as 0.1 microseconds or more, such as 1 microsecond or more, such as 5 microseconds or more, such as by 10 microseconds or more, such as by 15 microseconds or more, such as by 30 microseconds or more and including by 60 microseconds or more. For example, the time period between irradiation by each light source may range from 0.001 microseconds to 60 microseconds, such as from 0.01 microseconds to 50 microseconds, such as from 0.1 microseconds to 35 microseconds, such as from 1 microsecond to 25 microseconds and including from 5 microseconds to 10 microseconds. In certain embodiments, the time period between irradiation by each light source is 10 microseconds. In embodiments where sample is sequentially irradiated by more than two (i.e., 3 or more) lasers, the delay between irradiation by each laser may be the same or different.

The sample may be irradiated continuously or in discrete intervals. In some instances, the light source is configured to irradiate the sample in the flow cell continuously. In other embodiments, the light source is configured to provide laser light for irradiating the flow stream in discrete intervals. The term "discrete interval" is used herein in its conventional sense to refer to laser irradiation of the flow stream for a predetermined duration of time followed by a period of time where the flow stream is not irradiated by the laser (e.g., by turning off the laser or by blocking light laser conveyed from the light propagation component such as with a chopper, beam stop, etc.). In some embodiments, laser light from is conveyed to the flow stream in discrete intervals of 0.001 μs or more, such as for 0.005 μs or more, such as for 0.01 μs or more, such as for 0.05 μs or more, such as for 0.1 μs or more, such as for 0.5 μs or more, such as for 1 μs or more, such as for 5 μs or more, such as for 10 μs or more, such as for 50 μs or more, such as for 100 μs or more and including for 500 μs or more. In certain instances, laser light is conveyed to the flow stream in discrete intervals of from 0.0001 μs to 500 ms, such as from 0.0005 μs to 250 ms, such as from 0.001 μs to 50 ms, such as from 0.005 μs to 5 ms, such as from 0.01 μs to 1000 μs, such as from 0.05 to 750 μs, such as from 0.1 μs to 500 μs, such as from 0.5 μs to 250 μs, such as from 1 μs to 100 μs and including from 10 μs to 100 μs. The duration between each discrete interval may be 0.001 μs or more, such as 0.005 μs or more, such as 0.01 μs or more, such as 0.05 μs or more, such as 0.1 μs or more, such as 0.5 μs or more, such as 1 μs or more, such as 5 μs or more, such as 10 μs or more, such as 50 μs or more, such as 100 μs or more and including 500 μs or more. For example, the duration between each discrete interval may range from 0.0001 μs to 500 ms, such as from 0.0005 μs to 250 ms, such as from 0.001 μs to 50 ms, such as from 0.005 μs to 5 ms, such as from 0.01 μs to 1000 μs, such as from 0.05 to 750 μs, such as from 0.1 μs to 500 μs, such as from 0.5 μs to 250 μs, such as from 1 μs to 100 μs and including from 10 μs to 100 μs.

Aspects of the subject flow cytometers also include a detection module having one or more light detectors for detecting particle-modulated light. In some embodiments, the subject detection module is a single modular unit in which multiple detectors are co-located. Any convenient detector for detecting collected light may be employed in the detection module. For example, where the particle-modulated light includes side-scattered light, aspects of the invention may include a side-scatter detector configured to detect side-scatter wavelengths of light (e.g., light refracted and reflected from the surfaces and internal structures of the particle). In other embodiments, flow cytometers include multiple side-scatter detectors, such as 2 or more, such as 3 or more, such as 4 or more, and including 5 or more.

Any convenient detector for detecting collected light may be used in the side-scatter detector described herein. Detectors of interest may include, but are not limited to, optical sensors or detectors, such as active-pixel sensors (APSs), avalanche photodiodes, image sensors, charge-coupled devices (CCDs), intensified charge-coupled devices (ICCDs), light emitting diodes, photon counters, bolometers, pyroelectric detectors, photoresistors, photovoltaic cells, photodiodes, photomultiplier tubes (PMTs), phototransistors, quantum dot photoconductors or photodiodes and combinations thereof, among other detectors. In certain embodiments, the collected light is measured with a charge-coupled device (CCD), semiconductor charge-coupled devices (CCD), active pixel sensors (APS), complementary metal-oxide semiconductor (CMOS) image sensors or N-type metal-oxide semiconductor (NMOS) image sensors. In certain embodiments, the detector is a photomultiplier tube, such as a photomultiplier tube having an active detecting surface area of each region that ranges from 0.01 $cm^2$ to 10 $cm^2$, such as from 0.05 $cm^2$ to 9 $cm^2$, such as from, such as from 0.1 $cm^2$ to 8 $cm^2$, such as from 0.5 $cm^2$ to 7 $cm^2$ and including from 1 $cm^2$ to 5 $cm^2$.

Where the subject flow cytometers include multiple side-scatter detectors, each side-scatter detector may be the same, or the collection of side-scatter detectors may be a combination of different types of detectors. For example, where the subject flow cytometers include two side-scatter detectors, in some embodiments the first side-scatter detector is a CCD-type device and the second side-scatter detector (or imaging sensor) is a CMOS-type device. In other embodiments, both the first and second side-scatter detectors are CCD-type devices. In yet other embodiments, both the first and second side-scatter detectors are CMOS-type devices. In still other embodiments, the first side-scatter detector is a CCD-type device and the second side-scatter detector is a photomultiplier tube (PMT). In still other embodiments, the first side-scatter detector is a CMOS-type device and the second side-scatter detector is a photomultiplier tube. In yet other embodiments, both the first and second side-scatter detectors are photomultiplier tubes.

Embodiments of the invention also include a light dispersion/separator module positioned between the flow cell and the side-scatter detector. Light dispersion devices of interest include but are not limited to, colored glass, bandpass filters, interference filters, dichroic mirrors, diffraction gratings, monochromators and combinations thereof, among other wavelength separating devices.

In embodiments, the subject flow cytometers also include a fluorescent light detector configured to detect one or more fluorescent wavelengths of light. In other embodiments, flow cytometers include multiple fluorescent light detectors such as 2 or more, such as 3 or more, such as 4 or more, 5 or more, 10 or more, 15 or more, and including 20 or more.

Any convenient detector for detecting collected light may be used in the fluorescent light detector described herein. Detectors of interest may include, but are not limited to, optical sensors or detectors, such as active-pixel sensors (APSs), avalanche photodiodes, image sensors, charge-coupled devices (CCDs), intensified charge-coupled devices (ICCDs), light emitting diodes, photon counters, bolometers, pyroelectric detectors, photoresistors, photovoltaic cells, photodiodes, photomultiplier tubes (PMTs), phototransistors, quantum dot photoconductors or photodiodes and combinations thereof, among other detectors. In certain embodiments, the collected light is measured with a charge-coupled device (CCD), semiconductor charge-coupled devices (CCD), active pixel sensors (APS), complementary metal-oxide semiconductor (CMOS) image sensors or N-type metal-oxide semiconductor (NMOS) image sensors. In certain embodiments, the detector is a photomultiplier tube, such as a photomultiplier tube having an active detecting surface area of each region that ranges from 0.01 $cm^2$ to 10 $cm^2$, such as from 0.05 $cm^2$ to 9 $cm^2$, such as from, such as from 0.1 $cm^2$ to 8 $cm^2$, such as from 0.5 $cm^2$ to 7 $cm^2$ and including from 1 $cm^2$ to 5 $cm^2$.

Where the subject flow cytometers include multiple fluorescent light detectors, each fluorescent light detector may be the same, or the collection of fluorescent light detectors may be a combination of different types of detectors. For example, where the subject flow cytometers include two fluorescent light detectors, in some embodiments the first fluorescent light detector is a CCD-type device and the second fluorescent light detector (or imaging sensor) is a CMOS-type device. In other embodiments, both the first and second fluorescent light detectors are CCD-type devices. In yet other embodiments, both the first and second fluorescent light detectors are CMOS-type devices. In still other embodiments, the first fluorescent light detector is a CCD-type device and the second fluorescent light detector is a photomultiplier tube (PMT). In still other embodiments, the first fluorescent light detector is a CMOS-type device and the second fluorescent light detector is a photomultiplier tube. In yet other embodiments, both the first and second fluorescent light detectors are photomultiplier tubes.

Embodiments of the invention also include a light dispersion/separator module positioned between the flow cell and the fluorescent light detector. Light dispersion devices of interest include but are not limited to, colored glass, bandpass filters, interference filters, dichroic mirrors, diffraction gratings, monochromators and combinations thereof, among other wavelength separating devices.

In embodiments of the present disclosure, fluorescent light detectors of interest are configured to measure collected light at one or more wavelengths, such as at 2 or more wavelengths, such as at 5 or more different wavelengths, such as at 10 or more different wavelengths, such as at 25 or more different wavelengths, such as at 50 or more different wavelengths, such as at 100 or more different wavelengths, such as at 200 or more different wavelengths, such as at 300 or more different wavelengths and including measuring light emitted by a sample in the flow stream at 400 or more different wavelengths. In some embodiments, 2 or more detectors in a flow cytometer as described herein are configured to measure the same or overlapping wavelengths of collected light.

In some embodiments, fluorescent light detectors of interest are configured to measure collected light over a range of wavelengths (e.g., 200 nm-1000 nm). In certain embodiments, detectors of interest are configured to collect spectra of light over a range of wavelengths. For example, flow cytometers may include one or more detectors configured to collect spectra of light over one or more of the wavelength ranges of 200 nm-1000 nm. In yet other embodiments, detectors of interest are configured to measure light emitted by a sample in the flow stream at one or more specific wavelengths. For example, flow cytometers may include one or more detectors configured to measure light at one or more of 450 nm, 518 nm, 519 nm, 561 nm, 578 nm, 605 nm, 607 nm, 625 nm, 650 nm, 660 nm, 667 nm, 670 nm, 668 nm, 695 nm, 710 nm, 723 nm, 780 nm, 785 nm, 647 nm, 617 nm and any combinations thereof. In certain embodiments, one or more detectors may be configured to be paired with specific fluorophores, such as those used with the sample in a fluorescence assay.

Aspects of the invention also include a forward-scatter detector configured to detect forward-scattered light. The number of forward-scatter detectors in the subject flow cytometers may vary, as desired. For example, the subject particle analyzers may include 1 forward-scatter detector or multiple forward-scatter detectors, such as 2 or more, such as 3 or more, such as 4 or more, and including 5 or more. In certain embodiments, flow cytometers include 1 forward-scatter detector. In other embodiments, flow cytometers include 2 forward-scatter detectors.

Any convenient detector for detecting collected light may be used in the forward-scatter detector described herein. Detectors of interest may include, but are not limited to, optical sensors or detectors, such as active-pixel sensors (APSs), avalanche photodiodes, image sensors, charge-coupled devices (CCDs), intensified charge-coupled devices (ICCDs), light emitting diodes, photon counters, bolometers, pyroelectric detectors, photoresistors, photovoltaic cells, photodiodes, photomultiplier tubes (PMTs), phototransistors, quantum dot photoconductors or photodiodes and combinations thereof, among other detectors. In certain embodiments, the collected light is measured with a charge-coupled device (CCD), semiconductor charge-coupled devices (CCD), active pixel sensors (APS), complementary metal-oxide semiconductor (CMOS) image sensors or N-type metal-oxide semiconductor (NMOS) image sensors. In certain embodiments, the detector is a photomultiplier tube, such as a photomultiplier tube having an active detecting surface area of each region that ranges from 0.01 cm$^2$ to 10 cm$^2$, such as from 0.05 cm$^2$ to 9 cm$^2$, such as from, such as from 0.1 cm$^2$ to 8 cm$^2$, such as from 0.5 cm$^2$ to 7 cm$^2$ and including from 1 cm$^2$ to 5 cm$^2$.

Where the subject particle analyzers include multiple forward-scatter detectors, each detector may be the same, or the collection of detectors may be a combination of different types of detectors. For example, where the subject particle analyzers include two forward-scatter detectors, in some embodiments the first forward-scatter detector is a CCD-type device and the second forward-scatter detector (or imaging sensor) is a CMOS-type device. In other embodiments, both the first and second forward-scatter detectors are CCD-type devices. In yet other embodiments, both the first and second forward-scatter detectors are CMOS-type devices. In still other embodiments, the first forward-scatter detector is a CCD-type device and the second forward-scatter detector is a photomultiplier tube (PMT). In still other embodiments, the first forward-scatter detector is a CMOS-type device and the second forward-scatter detector is a photomultiplier tube. In yet other embodiments, both the first and second forward-scatter detectors are photomultiplier tubes.

Embodiments of the invention also include a light dispersion/separator module positioned between the flow cell and the forward-scatter detector. Light dispersion devices of interest include but are not limited to, colored glass, bandpass filters, interference filters, dichroic mirrors, diffraction gratings, monochromators and combinations thereof, among other wavelength separating devices. In some embodiments, a bandpass filter is positioned between the flow cell and the forward-scatter detector. In other embodiments, more than one bandpass filter is positioned between the flow cell and the forward-scatter detector, such as, for example, 2 or more, 3 or more, 4 or more, and including 5 or more. In embodiments, the bandpass filters have a minimum bandwidth ranging from 2 nm to 100 nm, such as from 3 nm to 95 nm, such as from 5 nm to 95 nm, such as from 10 nm to 90 nm, such as from 12 nm to 85 nm, such as from 15 nm to 80 nm and including bandpass filters having minimum bandwidths ranging from 20 nm to 50 nm. wavelengths and reflects light with other wavelengths to the forward-scatter detector.

In embodiments, the subject light detectors of the light detection module are configured to measure light continuously or in discrete intervals. In some instances, light detectors are configured to take measurements of the collected light continuously. In other instances, light collection elements of interest are configured to take measurements in discrete intervals, such as measuring light every 0.001 millisecond, every 0.01 millisecond, every 0.1 millisecond, every 1 millisecond, every 10 milliseconds, every 100 milliseconds and including every 1000 milliseconds, or some other interval. In further embodiments, the detectors of the light detection module are configured to demultiplex light collected by the fiber optic light collector. As described above, embodiments of the invention induce multiple lasers configured to irradiate the sample with multiplexed beams. As understood in the art, demultiplexing is the reverse process of multiplexing. Consequently, when particle-modulated light resulting from the irradiation of a sample with multiplexed lasers is transformed into electrical signals by the one or more detectors, the multiplexed signals are converted into separate, demultiplexed, signals that may be analyzed independently.

Embodiments of the invention further include an optical adjustment component positioned between the flow cell and the one or more light detectors. By "optical adjustment" is meant that a parameter of particle-modulated light may be changed as desired, such as to increase or decrease the width of the beam, beam irradiation direction, wavelength, beam profile, beam width, beam intensity, focal point, pulse width or some other parameter. In some instances, optical adjustment is a magnification protocol configured to increase the spatial dimensions of the beamspot, such as by 1% or greater, such as by 5% or greater, such as by 10% or greater, such as by 25% or greater, such as by 50% or greater and including increasing the spatial dimensions of the beamspot by 75% or greater. In other instances, optical adjustment is a de-magnification protocol configured to decrease the spatial dimensions of the laser beamspot, such as by 1% or greater, such as by 5% or greater, such as by 10% or greater, such as by 25% or greater, such as by 50% or greater and including decreasing the spatial dimensions of the laser beamspot by 75% or greater. In other instances, the optical adjustment includes collimating the at least first and second beams before irradiation of the light collection element via a beam collimator.

Suitable flow cytometry systems may include, but are not limited to those described in Ormerod (ed.), *Flow Cytometry: A Practical Approach*, Oxford Univ. Press (1997); Jaroszeski et al. (eds.), *Flow Cytometry Protocols*, Methods in Molecular Biology No. 91, Humana Press (1997); *Practical Flow Cytometry*, 3rd ed., Wiley-Liss (1995); Virgo, et al. (2012) *Ann Clin Biochem*. January; 49(pt 1):17-28; Linden, et. al., *Semin Throm Hemost*. 2004 October; 30(5):502-11; Alison, et al. *J Pathol*, 2010 December; 222(4):335-344; and Herbig, et al. (2007) *Crit Rev Ther Drug Carrier Syst*. 24(3):203-255; the disclosures of which are incorporated herein by reference. In certain instances, flow cytometry systems of interest include BD Biosciences FACSCanto™ flow cytometer, BD Biosciences FACSCanto™ II flow cytometer, BD Accuri™ flow cytometer, BD Accuri™ C6 Plus flow cytometer, BD Biosciences FACSCelesta™ flow cytometer, BD Biosciences FACSLyric™ flow cytometer, BD Biosciences FACSVerse™ flow cytometer, BD Biosciences FACSymphony™ flow cytometer, BD Biosciences LSRFortessa™ flow cytometer, BD Biosciences LSRFortessa™ X-20 flow cytometer, BD Biosciences FACSPresto™ flow cytometer, BD Biosciences FACSVia™ flow cytometer and BD Biosciences FACSCalibur™ cell sorter, a BD Biosciences FACSCount™ cell sorter, BD Biosciences FACSLyric™ cell sorter, BD Biosciences Via™ cell sorter, BD Biosciences Influx™ cell sorter, BD Biosciences Jazz™ cell sorter, BD Biosciences Aria™ cell sorter, BD Biosciences FACSAria™ II cell sorter, BD Biosciences FACSAria™ III cell sorter, BD Biosciences FACSAria™ Fusion cell sorter and BD Biosciences FACSMelody™ cell sorter, BD Biosciences FACSymphony™ S6 cell sorter or the like.

In some embodiments, the subject systems are flow cytometric systems, such those described in U.S. Pat. Nos. 10,663,476; 10,620,111; 10,613,017; 10,605,713; 10,585,031; 10,578,542; 10,578,469; 10,481,074; 10,302,545; 10,145,793; 10,113,967; 10,006,852; 9,952,076; 9,933,341; 9,726,527; 9,453,789; 9,200,334; 9,097,640; 9,095,494; 9,092,034; 8,975,595; 8,753,573; 8,233,146; 8,140,300; 7,544,326; 7,201,875; 7,129,505; 6,821,740; 6,813,017; 6,809,804; 6,372,506; 5,700,692; 5,643,796; 5,627,040; 5,620,842; 5,602,039; 4,987,086; 4,498,766; the disclosures of which are herein incorporated by reference in their entirety.

In certain instances, flow cytometry systems of the invention are configured for imaging particles in a flow stream by fluorescence imaging using radiofrequency tagged emission (FIRE), such as those described in Diebold, et al. Nature Photonics Vol. 7(10); 806-810 (2013) as well as described in U.S. Pat. Nos. 9,423,353; 9,784,661; 9,983,132; 10,006,852; 10,078,045; 10,036,699; 10,222,316; 10,288,546; 10,324,019; 10,408,758; 10,451,538; 10,620,111; and U.S. Patent Publication Nos. 2017/0133857; 2017/0328826; 2017/0350803; 2018/0275042; 2019/0376895 and 2019/0376894 the disclosures of which are herein incorporated by reference.

Figure 4:
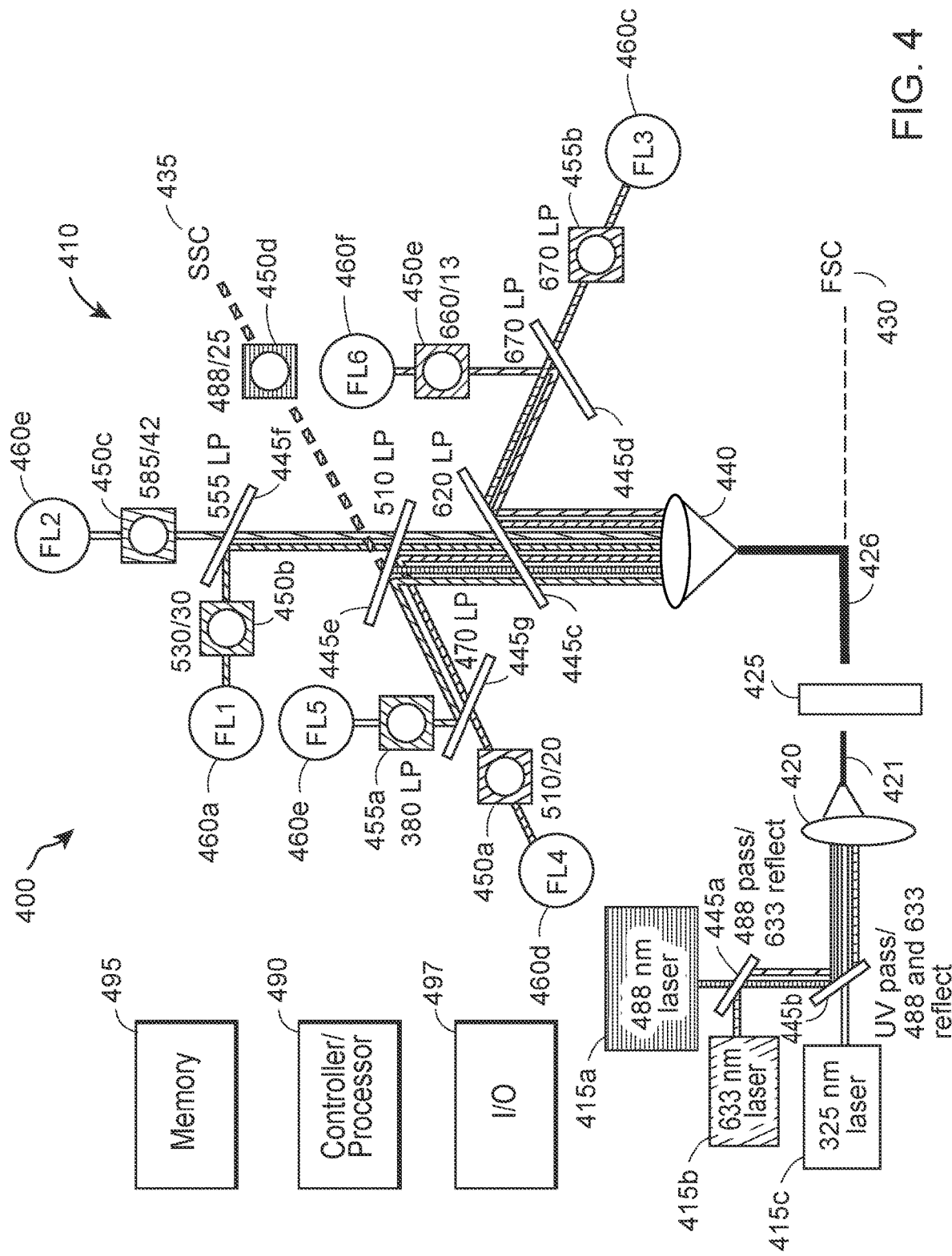
FIG. 4 depicts a flow cytometer having a fiber optic light collector according to certain embodiments.

FIG. 4 shows a system 400 for flow cytometry in accordance with an illustrative embodiment of the present invention. The system 400 includes a flow cytometer 410, a controller/processor 490 and a memory 495. The flow cytometer 410 includes one or more excitation lasers 415a-415c, a focusing lens 420, a flow cell 425, and a detection module having a forward-scatter detector 430, a side-scatter detector 435, a fluorescence collection lens 440, one or more beam splitters 445a-445g, one or more bandpass filters 450a-450e, one or more longpass ("LP") filters 455a-455b, and one or more fluorescent light detectors 460a-460f.

The excitation lasers 415a-c emit light in the form of a laser beam. The wavelengths of the laser beams emitted from excitation lasers 415a-415c are 488 nm, 633 nm, and 325 nm, respectively, in the example system of FIG. 4. The laser beams are first directed through one or more of beam splitters 445a and 445b. Beam splitter 445a transmits light at 488 nm and reflects light at 633 nm. Beam splitter 445b transmits UV light (light with a wavelength in the range of 10 to 400 nm) and reflects light at 488 nm and 633 nm. I The laser beams are then directed to a focusing lens 420, which focuses the beams onto a fiber optic light conveyor 421 that conveys the excitation light to the portion of a fluid stream where particles of a sample are located (i.e., core stream), within the flow cell 425. The flow cell is part of a fluidics system which directs particles, typically one at a time, in a stream to the focused laser beam for interrogation. The flow cell can comprise a flow cell in a benchtop cytometer or a nozzle tip in a stream-in-air cytometer.

The light from the laser beam(s) interacts with the particles in the sample by diffraction, refraction, reflection, scattering, and absorption with re-emission at various different wavelengths depending on the characteristics of the particle such as its size, internal structure, and the presence of one or more fluorescent molecules attached to or naturally present on or in the particle. In the example of FIG. 4, fluorescent light and side-scattered light is collected at the proximal end of fiber optic light collector 426 and conveyed to side-scatter detector 435, and the one or more fluorescent light detectors 460a-460f through one or more of the beam splitters 445c-445g, the bandpass filters 450a-450e, the longpass filters 455a-455b, and the fluorescence collection lens 440. As discussed above, fiber optic light collector 426 is optically aligned to the core stream within flow cell 425 and includes a collection surface having opposing edges running parallel to the direction of the core stream.

The fluorescence collection lens 440 collects light emitted from the particle-laser beam interaction and routes that light towards one or more beam splitters and filters. Bandpass filters, such as bandpass filters 450a-450e, allow a narrow range of wavelengths to pass through the filter. For example, bandpass filter 450a is a 510/20 filter. The first number represents the center of a spectral band. The second number provides a range of the spectral band. Thus, a 510/20 filter extends 10 nm on each side of the center of the spectral band, or from 500 nm to 520 nm. Shortpass filters transmit wavelengths of light equal to or shorter than a specified wavelength. Longpass filters, such as longpass filters 455a-455b, transmit wavelengths of light equal to or longer than a specified wavelength of light. For example, longpass filter 455b, which is a 670 nm longpass filter, transmits light equal to or longer than 670 nm. Filters are often selected to optimize the specificity of a detector for a particular fluorescent dye. The filters can be configured so that the spectral band of light transmitted to the detector is close to the emission peak of a fluorescent dye.

The side-scatter detector 435 is configured to detect refracted and reflected light from the surfaces and internal structures of the particle, and tends to increase with increasing particle complexity of structure. The fluorescence emissions from fluorescent molecules associated with the particle can be detected by the one or more fluorescent light detectors 460a-460f. The side-scatter detector 435 and fluorescent light detectors can include photomultiplier tubes. The signals detected at the forward-scatter detector 430, the side-scatter detector 435 and the fluorescent detectors can be converted to electronic signals (voltages) by the detectors. This data can provide information about the sample.

The forward-scatter detector 430 is positioned off axis from the direct beam through the flow cell and is configured to detect diffracted light, the excitation light that travels through or around the particle in mostly a forward direction (dashed line). The intensity of the light detected by the forward-scatter detector is dependent on the overall size of the particle. The forward-scatter detector can include a photodiode.

In operation, cytometer operation is controlled by a controller/processor 490, and the measurement data from the detectors can be stored in the memory 495 and processed by the controller/processor 490. Although not shown explicitly, the controller/processor 490 is coupled to the detectors to receive the output signals therefrom, and may also be coupled to electrical and electromechanical components of the flow cytometer 410 to control the lasers, fluid flow parameters, and the like. Input/output (I/O) capabilities 497 may be provided also in the system. The memory 495, controller/processor 490, and I/O 497 may be entirely provided as an integral part of the flow cytometer 410. In such an embodiment, a display may also form part of the I/O capabilities 497 for presenting experimental data to users of the cytometer 410. Alternatively, some or all of the memory 495 and controller/processor 490 and I/O capabilities may be part of one or more external devices such as a general purpose computer. In some embodiments, some or all of the memory 495 and controller/processor 490 can be in wireless or wired communication with the cytometer 410. The controller/processor 490 in conjunction with the memory 495 and the I/O 497 can be configured to perform various functions related to the preparation and analysis of a flow cytometer experiment.

The system illustrated in FIG. 4 includes six different detectors that detect fluorescent light in six different wavelength bands (which may be referred to herein as a "filter window" for a given detector) as defined by the configuration of filters and/or splitters in the beam path from the flow cell 425 to each detector. Different fluorescent molecules used for a flow cytometer experiment will emit light in their own characteristic wavelength bands. The particular fluorescent labels used for an experiment and their associated fluorescent emission bands may be selected to generally coincide with the filter windows of the detectors. However, as more detectors are provided, and more labels are utilized, perfect correspondence between filter windows and fluorescent emission spectra is not possible. It is generally true that although the peak of the emission spectra of a particular fluorescent molecule may lie within the filter window of one particular detector, some of the emission spectra of that label will also overlap the filter windows of one or more other detectors. This may be referred to as spillover. The I/O 497 can be configured to receive data regarding a flow cytometer experiment having a panel of fluorescent labels and a plurality of cell populations having a plurality of markers, each cell population having a subset of the plurality of markers. The I/O 497 can also be configured to receive biological data assigning one or more markers to one or more cell populations, marker density data, emission spectrum data, data assigning labels to one or more markers, and cytometer configuration data. Flow cytometer experiment data, such as label spectral characteristics and flow cytometer configuration data can also be stored in the memory 495. The controller/processor 490 can be configured to evaluate one or more assignments of labels to markers.

One of skill in the art will recognize that a flow cytometer in accordance with an embodiment of the present invention is not limited to the flow cytometer depicted in FIG. 4, but can include any flow cytometer known in the art. For example, a flow cytometer may have any number of lasers, beam splitters, filters, and detectors at various wavelengths and in various different configurations.

In some embodiments, the subject systems are particle sorting systems that are configured to sort particles with an enclosed particle sorting module, such as those described in U.S. Patent Publication No. 2017/0299493, filed on Mar. 28, 2017, the disclosure of which is incorporated herein by reference. In certain embodiments, particles (e.g., cells) of the sample are sorted using a sort decision module having a plurality of sort decision units, such as those described in U.S. Patent Publication No. 2020/0256781, filed on Dec. 23, 2019, the disclosure of which is incorporated herein by reference. In some embodiments, systems for sorting components of a sample include a particle sorting module having deflector plates, such as described in U.S. Patent Publication No. 2017/0299493, filed on Mar. 28, 2017, the disclosure of which is incorporated herein by reference.

Figure 5:
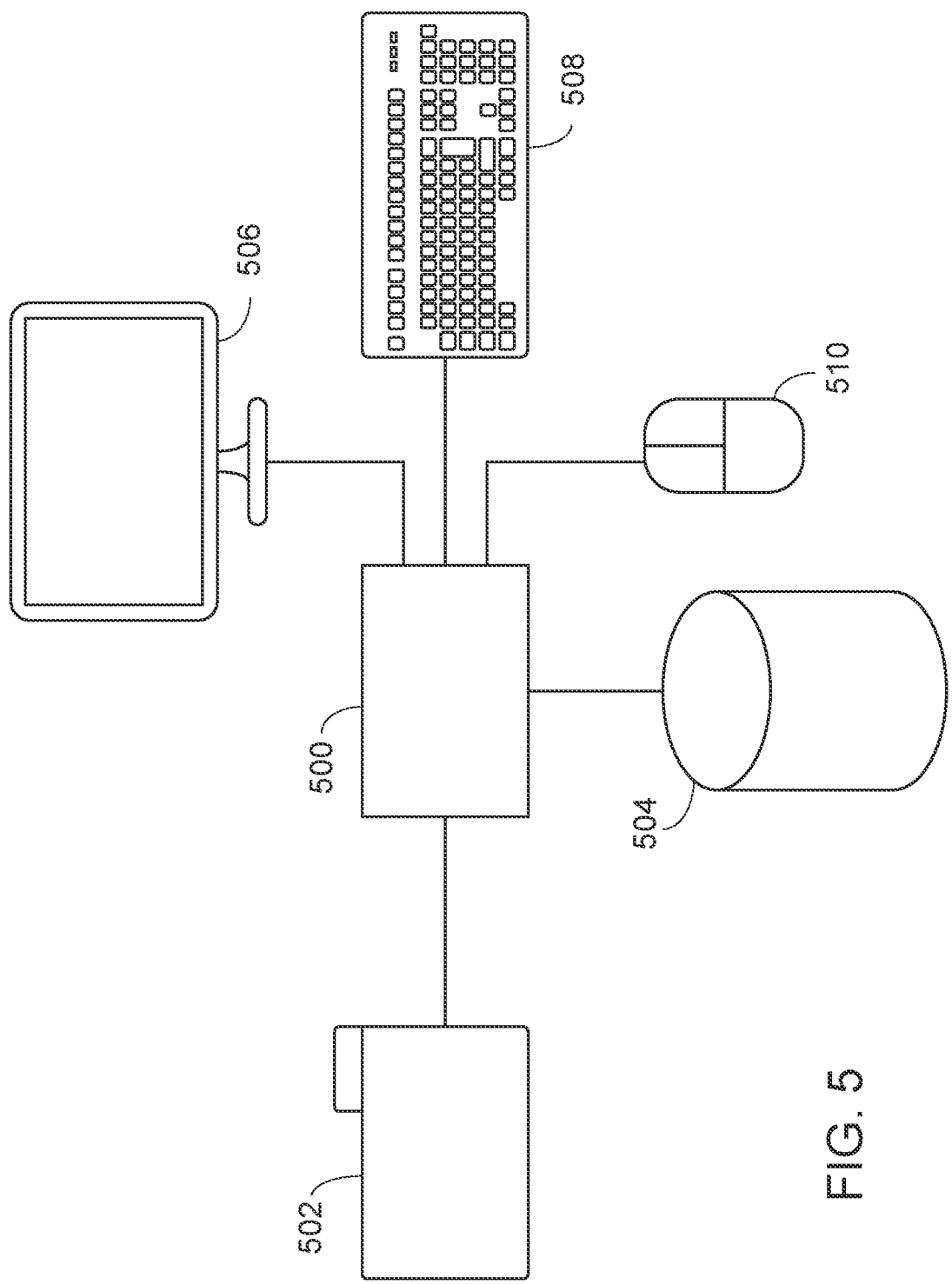
FIG. 5 depicts a functional block diagram for one example of a sorting control system according to certain embodiments.

FIG. 5 shows a functional block diagram for one example of a sorting control system, such as a processor 500, for analyzing and displaying biological events. A processor 500 can be configured to implement a variety of processes for controlling graphic display of biological events.

A flow cytometer or sorting system 502 can be configured to acquire biological event data. For example, a flow cytometer can generate flow cytometric event data. The flow cytometer 502 can be configured to provide biological event data to the processor 500. A data communication channel can be included between the flow cytometer 502 and the processor 500. The biological event data can be provided to the processor 500 via the data communication channel.

The processor 500 can be configured to receive biological event data from the flow cytometer 502. The biological event data received from the flow cytometer 502 can include flow cytometric event data. The processor 500 can be configured to provide a graphical display including a first plot of biological event data to a display device 506. The processor 500 can be further configured to render a region of interest as a gate around a population of biological event data shown by the display device 506, overlaid upon the first plot, for example. In some embodiments, the gate can be a logical combination of one or more graphical regions of interest drawn upon a single parameter histogram or bivariate plot. In some embodiments, the display can be used to display particle parameters or saturated detector data.

The processor 500 can be further configured to display the biological event data on the display device 506 within the gate differently from other events in the biological event data outside of the gate. For example, the processor 500 can be configured to render the color of biological event data contained within the gate to be distinct from the color of biological event data outside of the gate. The display device 506 can be implemented as a monitor, a tablet computer, a smartphone, or other electronic device configured to present graphical interfaces.

The processor 500 can be configured to receive a gate selection signal identifying the gate from a first input device. For example, the first input device can be implemented as a mouse 510. The mouse 510 can initiate a gate selection signal to the processor 500 identifying the gate to be displayed on or manipulated via the display device 506 (e.g., by clicking on or in the desired gate when the cursor is positioned there). In some implementations, the first device can be implemented as the keyboard 508 or other means for providing an input signal to the processor 500 such as a touchscreen, a stylus, an optical detector, or a voice recognition system. Some input devices can include multiple inputting functions. In such implementations, the inputting functions can each be considered an input device. For example, as shown in FIG. 5, the mouse 510 can include a right mouse button and a left mouse button, each of which can generate a triggering event.

The triggering event can cause the processor 500 to alter the manner in which the data is displayed, which portions of the data is actually displayed on the display device 506, and/or provide input to further processing such as selection of a population of interest for particle sorting.

In some embodiments, the processor 500 can be configured to detect when gate selection is initiated by the mouse 510. The processor 500 can be further configured to automatically modify plot visualization to facilitate the gating process. The modification can be based on the specific distribution of biological event data received by the processor 500.

The processor 500 can be connected to a storage device 504. The storage device 504 can be configured to receive and store biological event data from the processor 500. The storage device 504 can also be configured to receive and store flow cytometric event data from the processor 500. The storage device 504 can be further configured to allow retrieval of biological event data, such as flow cytometric event data, by the processor 500.

The display device 506 can be configured to receive display data from the processor 500. The display data can comprise plots of biological event data and gates outlining sections of the plots. The display device 506 can be further configured to alter the information presented according to input received from the processor 500 in conjunction with input from the flow cytometer 502, the storage device 504, the keyboard 508, and/or the mouse 510.

In some implementations the processor 500 can generate a user interface to receive example events for sorting. For example, the user interface can include a control for receiving example events or example images. The example events or images or an example gate can be provided prior to collection of event data for a sample or based on an initial set of events for a portion of the sample.

Figure 6A:
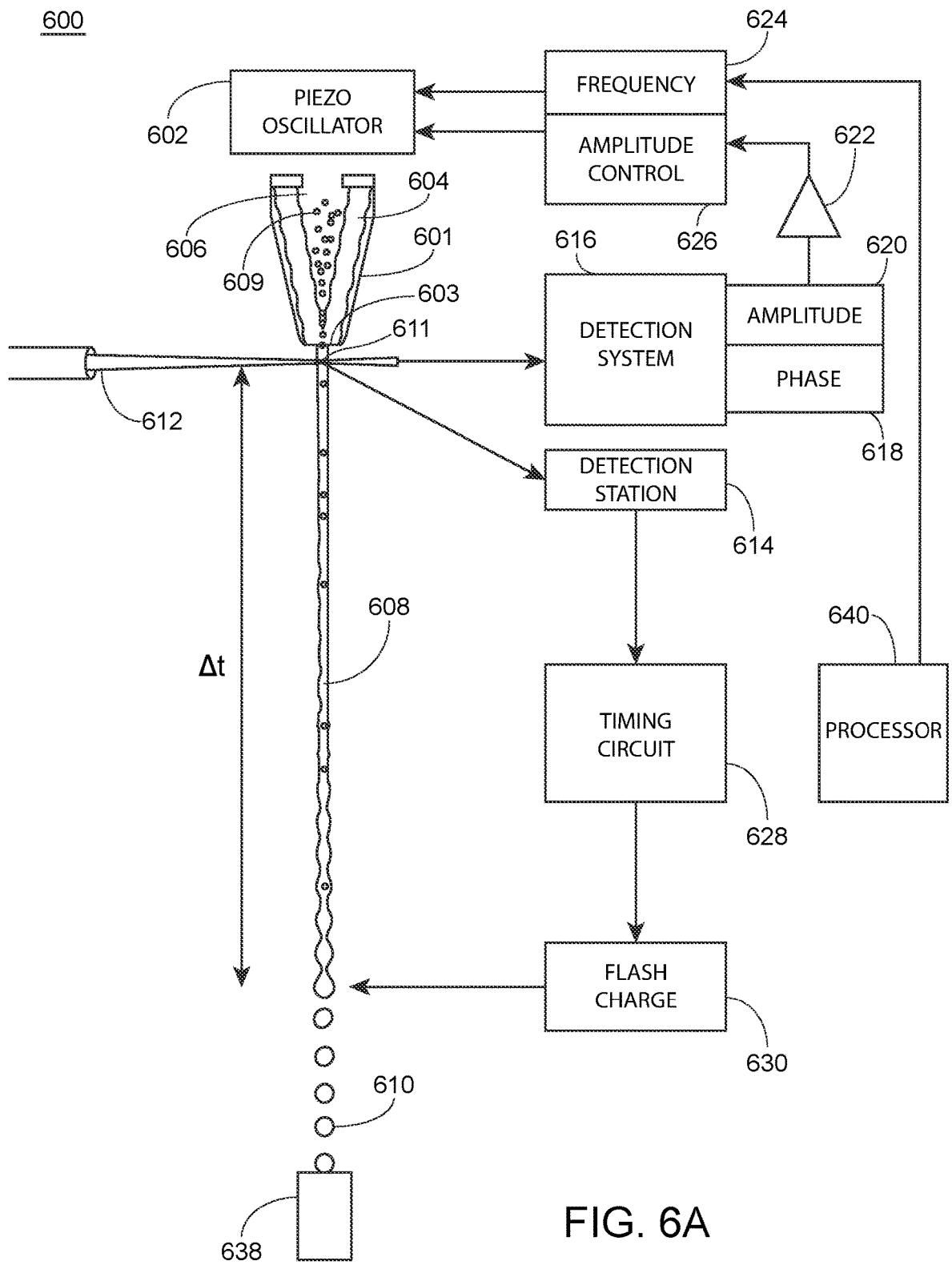
FIG. 6A depicts a schematic drawing of a particle sorter system according to certain embodiments.

FIG. 6A is a schematic drawing of a particle sorter system 600 (e.g., the flow cytometer 602) in accordance with one embodiment presented herein. In some embodiments, the particle sorter system 600 is a cell sorter system. As shown in FIG. 6A, a drop formation transducer 602 (e.g., piezo-oscillator) is coupled to a fluid conduit 601, which can be coupled to, can include, or can be, a nozzle 603. Within the fluid conduit 601, sheath fluid 604 hydrodynamically focuses a sample fluid 606 comprising particles 609 into a moving fluid column 608 (e.g. a stream). Within the moving fluid column 608, particles 609 (e.g., cells) are lined up in single file to cross a monitored area 611 (e.g., where laser-stream intersect), irradiated by an irradiation source 612 (e.g., a laser). Vibration of the drop formation transducer 602 causes moving fluid column 608 to break into a plurality of drops 610, some of which contain particles 609.

In operation, a detection station 614 (e.g., an event detector) identifies when a particle of interest (or cell of interest) crosses the monitored area 611. Detection station 614 feeds into a timing circuit 628, which in turn feeds into a flash charge circuit 630. At a drop break off point, informed by a timed drop delay (at), a flash charge can be applied to the moving fluid column 608 such that a drop of interest carries a charge. The drop of interest can include one or more particles or cells to be sorted. The charged drop can then be sorted by activating deflection plates (not shown) to deflect the drop into a vessel such as a collection tube or a multi-well or microwell sample plate where a well or microwell can be associated with drops of particular interest. As shown in FIG. 6A, the drops can be collected in a drain receptacle 638.

A detection system 616 (e.g. a drop boundary detector) serves to automatically determine the phase of a drop drive signal when a particle of interest passes the monitored area 611. An exemplary drop boundary detector is described in U.S. Pat. No. 7,679,039, which is incorporated herein by reference in its entirety. The detection system 616 allows the instrument to accurately calculate the place of each detected particle in a drop. The detection system 616 can feed into an amplitude signal 620 and/or phase 618 signal, which in turn feeds (via amplifier 622) into an amplitude control circuit 626 and/or frequency control circuit 624. The amplitude control circuit 626 and/or frequency control circuit 624, in turn, controls the drop formation transducer 602. The amplitude control circuit 626 and/or frequency control circuit 624 can be included in a control system.

In some implementations, sort electronics (e.g., the detection system 616, the detection station 614 and a processor 640) can be coupled with a memory configured to store the detected events and a sort decision based thereon. The sort decision can be included in the event data for a particle. In some implementations, the detection system 616 and the detection station 614 can be implemented as a single detection unit or communicatively coupled such that an event measurement can be collected by one of is the detection system 616 or the detection station 614 and provided to the non-collecting element.

Figure 6B:
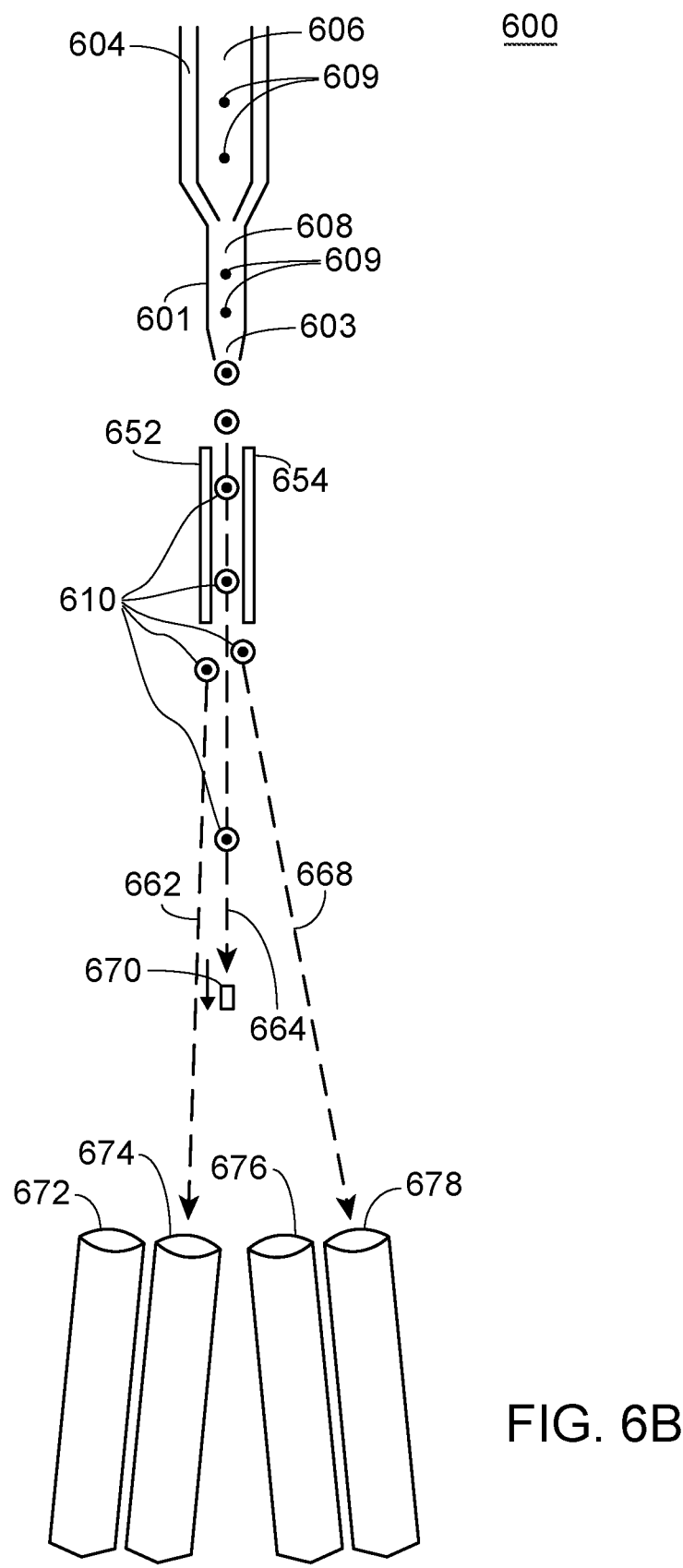
FIG. 6B depicts a schematic drawing of a particle sorter system according to certain embodiments.

FIG. 6B is a schematic drawing of a particle sorter system, in accordance with one embodiment presented herein. The particle sorter system 600 shown in FIG. 6B, includes deflection plates 652 and 654. A charge can be applied via a stream-charging wire in a barb. This creates a stream of droplets 610 containing particles 610 for analysis. The particles can be illuminated with one or more light sources (e.g., lasers) to generate light scatter and fluorescence information. The information for a particle is analyzed such as by sorting electronics or other detection system (not shown in FIG. 6B). The deflection plates 652 and 654 can be independently controlled to attract or repel the charged droplet to guide the droplet toward a destination collection receptacle (e.g., one of 672, 674, 676, or 678). As shown in FIG. 6B, the deflection plates 652 and 654 can be controlled to direct a particle along a first path 662 toward the receptacle 674 or along a second path 668 toward the receptacle 678. If the particle is not of interest (e.g., does not exhibit scatter or illumination information within a specified sort range), deflection plates may allow the particle to continue along a flow path 664. Such uncharged droplets may pass into a waste receptacle such as via aspirator 670.

The sorting electronics can be included to initiate collection of measurements, receive fluorescence signals for particles, and determine how to adjust the deflection plates to cause sorting of the particles. Example implementations of the embodiment shown in FIG. 6B include the BD FACSAria™ line of flow cytometers commercially provided by Becton, Dickinson and Company (Franklin Lakes, N.J.).

Methods of Analyzing a Sample

Aspects of the invention further include methods of analyzing a sample. Embodiments of the subject methods involve introducing a sample into a flow cytometer having a flow cell configured to transport particles in a core stream, a light source configured to produce a beam for irradiating the particles in the core stream and a fiber optic light collector for receiving particle-modulated light from the irradiated particles and conveying collected light to a detector. In embodiments, the fiber optic light collector is optically aligned to the core stream and includes a collection surface having opposing edges running parallel to the direction of the core stream.

The sample analyzed can be any sample that is of interest to a user. In certain embodiments, the sample contains a biological component, or is a biological sample. The term "biological sample" is used in its conventional sense to refer to a sample derived from or containing a whole organism, e.g., prokaryotic cells, eukaryotic cells, plants, fungi or a subset of animal tissues, cells or component parts which may in certain instances be found in blood, mucus, lymphatic fluid, synovial fluid, cerebrospinal fluid, saliva, bronchoalveolar lavage, amniotic fluid, amniotic cord blood, urine, vaginal fluid and semen. As such, a "biological sample" refers to both the native organism or a subset of its tissues as well as to: a homogenate; isolated, purified or enriched biological particles (e.g., DNA, RNA, proteins, sub-cellular organelles, etc.); and lysates or extracts prepared from the organism or a subset of its tissues, including but not limited to, for example, plasma, serum, spinal fluid, lymph fluid, sections of the skin, respiratory, gastrointestinal, cardiovascular, and genitourinary tracts, tears, saliva, milk, blood cells, tumors, organs. Biological samples may be any type of organismic tissue, including both healthy and diseased tissue (e.g., cancerous, malignant, necrotic, etc.). In certain embodiments, the biological sample is a liquid sample, such as blood or derivative thereof, e.g., plasma, tears, urine, semen, etc., where in some instances the sample is a blood sample, including whole blood, such as blood obtained from venipuncture or fingerstick (where the blood may or may not be combined with any reagents prior to assay, such as preservatives, anticoagulants, etc.).

In certain embodiments the source of the sample is a "mammal" or "mammalian", where these terms are used broadly to describe organisms which are within the class mammalia, including the orders carnivore (e.g., dogs and cats), rodentia (e.g., mice, guinea pigs, and rats), and primates (e.g., humans, chimpanzees, and monkeys). In some instances, the subjects are humans. The methods may be applied to samples obtained from human subjects of both genders and at any stage of development (i.e., neonates, infant, juvenile, adolescent, adult), where in certain embodiments the human subject is a juvenile, adolescent or adult. While embodiments of the present disclosure may be applied to samples from a human subject, it is to be understood that the methods may also be carried-out on samples from other animal subjects (that is, in "non-human subjects") such as, but not limited to, birds, mice, rats, dogs, cats, livestock and horses.

In practicing methods according to certain embodiments, a sample (e.g., in a core stream of a flow cytometer) is irradiated with light from a light source. Any convenient light source may be employed. In some instances, methods include the irradiation of a flow cell with a laser. In some embodiments, methods include the irradiation of the flow cell with a plurality of lasers. In certain embodiments, the laser may be any convenient laser, such as a continuous wave laser. For example, the laser may be a diode laser, such as an ultraviolet diode laser, a visible diode laser and a near-infrared diode laser. In other embodiments, the laser may be a helium-neon (HeNe) laser. In some instances, the laser is a gas laser, such as a helium-neon laser, argon laser, krypton laser, xenon laser, nitrogen laser, CO2 laser, CO laser, argon-fluorine (ArF) excimer laser, krypton-fluorine (KrF) excimer laser, xenon chlorine (XeCl) excimer laser or xenon-fluorine (XeF) excimer laser or a combination thereof. In other instances, lasers for practicing the subject methods include a dye laser, such as a stilbene, coumarin or rhodamine laser. In yet other instances, lasers of interest include a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof. In still other instances, lasers for practicing the subject methods include a solid-state laser, such as a ruby laser, an Nd:YAG laser, NdCrYAG laser, Er:YAG laser, Nd:YLF laser, Nd:YVO$_4$ laser, Nd:YCa$_4$O(BO$_3$)$_3$ laser, Nd:YCOB laser, titanium sapphire laser, thulim YAG laser, ytterbium YAG laser, ytterbium$_2$O$_3$ laser or cerium doped lasers and combinations thereof.

In certain cases, methods include conveying light from each of a plurality of lasers to the flow cell via a fiber optic light conveyor. In such cases, the subject fiber optic light conveyor includes a light transparent material and possesses a proximal end for receiving light from one or more lasers in the plurality of lasers and a distal end for projecting the received light onto the flow cell such that the particles in the core stream are irradiated. In certain instances, methods include the use of a single fiber optic light conveyor for conveying light from each laser in the plurality of lasers. In such instances, each laser is optically aligned to the same fiber optic light conveyor. In some embodiments, the transparent material includes a glass material such as, but not limited to, silica (e.g., fused silica). In other embodiments, the transparent material includes a polymeric material. In such embodiments, the transparent material may include one or more materials such as, but not limited to, poly(methylmethacrylate) (PMMA), polystyrene, and poly(perfluorobutenyl vinyl ether) (CYTOP). In some embodiments, the fiber optic light conveyor is a single-mode fiber. In other instances, the fiber optic light conveyor is a multi-mode fiber.

Where more than one laser is employed, the sample may be irradiated with the lasers simultaneously or sequentially, or a combination thereof. For example, the sample may be simultaneously irradiated with each of the lasers. In other embodiments, the flow stream is sequentially irradiated with each of the lasers. As such, in some embodiments of the methods involving multiple lasers, the light source may be configured to irradiate the sample with multiplexed beams. Any convenient multiplexing method may be employed. For example, the lasers may be configured to produce time-multiplexed beams. "Time-multiplexing" is referred to in its conventional sense to describe transmitting independent signals over a common signal path such that each signal is only transmitted over a fraction of time in an alternating pattern. In some embodiments of the invention that include a plurality of multiplexed lasers, a single fiber optic light conveyor may be provided to convey multiplexed beams from the plurality of lasers to the flow cell.

As discussed above, fiber optic light collectors according to embodiments of the invention include a collection surface having opposing edges running parallel to the direction of the core stream. By "opposing" edges, it is meant edges running parallel to one another and existing on opposite sides of the collection surface of the fiber optic light collector. As such, the collection surface of the fiber optic light collector may be defined by straight edges. Put another way, the subject fiber optic light collector is not a circular fiber. By "running parallel" to the core stream, it is meant that the opposing straight edges of the collection surface of the fiber optic light collector run in a parallel direction with respect to the axis along which particles are transported within the core stream. The opposing edges may possess any convenient length. In some cases, the opposing edges running parallel to the direction of the core stream each range from 50 μm to 2000 μm, such as 100 μm to 1000 μm, and including 200 μm to 800 μm. In certain cases, the opposing edges running parallel to the direction of the core stream each range from 100 μm to 1000 μm in length. In additional embodiments, the opposing edges running parallel to the direction of the core stream are each 150 μm in length. Some embodiments of the collection surface may, consequently, be defined by any convenient shape having opposing parallel edges. For example, the collection surface of the fiber optic light collector may be shaped substantially like a rectangle, square, parallelogram, rhombus, trapezoid or the like.

In addition to possessing opposing edges running parallel to the direction of the core stream, fiber optic light collectors of interest may include opposing edges that run perpendicular to the direction of the core stream. By "running perpendicular" to the core stream, it is meant that opposing straight edges of the collection surface of the fiber optic light collector run in a perpendicular direction with respect to the axis along which particles are transported within the core stream. The opposing edges may possess any convenient length. In some cases, the opposing edges running perpendicular to the direction of the core stream each range from 50 µm to 2000 µm, such as 100 µm to 1000 µm, and including 200 µm to 800 µm. In certain cases, the opposing edges running perpendicular to the direction of the core stream each range from 100 µm to 1000 µm in length. In additional embodiments, the opposing edges running perpendicular to the direction of the core stream are each 150 µm in length. In embodiments of the fiber optic light collector collection surface having opposing edges running parallel to the direction of the flow cell and opposing edges running perpendicular to the direction of the flow cell, the collection surface may be defined by any convenient corresponding shape. In some instances, the collection surface of the fiber optic light collector is rectangular. In other instances, the collection surface of the fiber optic light collection element is square. In some embodiments, the collection surface possesses rounded corners. In other embodiments, the collection surface possesses square corners. Examples of optical fibers having opposing edges running parallel to the direction of the flow stream and opposing edges running perpendicular to the direction of the flow stream that may be adapted for use in the present invention include, but are not limited to, the square-core multimode fiber manufactured by Thorlabs, Inc., the square core fiber manufactured by Fiberguide Industries, Inc., and the rectangular-core fiber manufactured by nLIGHT Corporation.

According to aspects of the disclosure, fiber optic light collectors are optically aligned to the core stream. A core stream and fiber optic light collector may be described as "optically aligned" when the elements are arranged adjacently to one another such that an optimal amount of light emitting from irradiated particles passing through the core stream is collected and conveyed by the fiber optic light collector. The subject fiber optic light collector may be separated from the flow cell and core stream by any convenient distance. In some embodiments, the fiber optic light collector is separated from the flow cell by a distance ranging from 5 mm to 300 mm, such as 10 mm to 200 mm. In embodiments, optically aligned fiber optic light collectors and core streams are arranged such that the opposing edges of the collection surface are perpendicular and/or parallel with respect to the axis along which particles are transported within the core stream, as appropriate.

As discussed above, methods also include focusing particle-modulated light onto a light detector via an objective lens. Objective lenses of interest for focusing particle-modulated light propagating within a first light collection cone may include one or a combination of a collimating lens, a focusing lens, a magnifying lens, a de-magnifying lens, or other lens, that are configured to receive light from a detection zone of a flow cell and produce imaged light.

In certain instances, methods include focusing light onto the collection surface of the fiber optic light collector via a refractive optical element positioned between the objective lens and the fiber optic light collector. In some embodiments, the refractive optical element is located 10 mm or less from the fiber optic light collector, such as 5 mm or less, 2 mm or less, 1 mm or less, 0.5 mm or less, 0.1 mm or less, 0.05 mm or less, 0.001 mm and including where the refractive optical element and fiber optic light collector are in physical contact. In such embodiments, the refractive optical element is configured to collect objective lens focused light and project the collected objective lens focused light onto the surface of the fiber optic light collector so that the light may be conveyed to one or more detectors. "Refraction" as discussed herein is described in its conventional sense to refer to light changing its direction after passing through a medium. As such, in embodiments, the refractive optical element is configured to alter the direction of objective lens focused light such that the light propagates along a single optical axis and illuminates the surface of the fiber optic light collector. In some instances, objective lens focused light is collected such that 70% or more of the objective lens focused light illuminates the surface of the fiber optic light collector and is subsequently conveyed to one or more detectors in the detector assembly, such as 80% or more, 90% or more, 95% or more, 97% or more, and including 99% or more of objective lens focused light. In embodiments, refraction by the refractive optical element provides additional optical power for coupling objective lens focused light into the fiber optic light collector.

Any convenient device for refracting and collecting light may be employed as the subject refractive optical element. In some embodiments, the refractive optical element is a prism. The "prism" discussed herein is described in its conventional sense to refer to a transparent optical element configured to refract light. Refractive optical elements of interest may include any suitable shape including but not limited to rectilinear cross sectional shapes, e.g., squares, rectangles, trapezoids, triangles, hexagons, etc., curvilinear cross-sectional shapes, e.g., circles, ovals, etc., as well as irregular shapes, e.g., a parabolic bottom portion coupled to a planar top portion, etc. In other embodiments, the refractive optical element includes a cylindrical lens. In such embodiments, the lens is configured to collect objective lens focused light and project the objective lens focused light onto the surface of the fiber optic light collector.

In some embodiments, the refractive optical element possesses a refractive index that ranges from 1 to 3, such as from 1.1 to 2.9, such as from 1.2 to 2.8, such as from 1.3 to 2.7, such as from 1.4 to 2.6, such as from 1.5 to 2.7, such as from 1.6 to 2.6, such as from 1.7 to 2.5, such as from 1.8 to 2.4 and including from 1.9 to 2.3. Depending on the transparency desired, refractive optical elements of interest may be formed from any suitable material including but not limited to glass (e.g., N-SF10, N-SF11, N-SF57, N-BK7, N-LAK21 or N-LAF35 glass), silica (e.g., fused silica), quartz, crystal (e.g., $CaF_2$ crystal), zinc selenide (ZnSe), $F_2$, germanium (Ge) titanate (e.g., S-TIH11), borosilicate (e.g., BK7). In some embodiments, the refractive optical element has a transparency window of from 150 nm to 5 µm; from 180 nm to 8 µm, from 185 nm to 2.1 µm, from 200 nm to 6 µm, from 200 nm to 11 µm, from 250 nm to 1.6 µm, from 350 nm to 2 µm, from 600 nm to 16 µm, from 1.2 µm to 8 µm, from 2 µm to 16 µm or some other wavelength range.

In some instances, light refracted by the refractive optical element continues to propagate along an axis that is parallel to the optical axis established by the light source. In other embodiments, light refracted by the refractive optical element may propagate along an axis possessing an angle of deviation relative to the optical axis established by the light source. In such embodiments, deviation may range from 0.001 arc minute to 10 arc minute, such as from 0.005 arc minute to 9 arc minute, such as from 0.01 arc minute to 8 arc minute, such as from 0.05 arc minute to 7 arc minute, such as from 0.1 arc minute to 6 arc minute, such as from 0.5 arc minute to 5 arc minute and including from 1 arc minute to 3 arc minute. In some embodiments, the light separation component provides for a beam deviation that is 5 arc minute or less, such as 4 arc minute or less, such as 3 arc minute or less, such as 2 arc minute or less, such as 1 arc minute or less, such as 0.5 arc minute or less, such as 0.1 arc minute or less, such as 0.05 arc minute or less, such as 0.01 arc minute or less, such as 0.005 arc minute or less, such as 0.001 arc minute or less and including providing for a laser beam deviation angle of 0.0001 arc minute or less.

Aspects of the subject methods also include detecting particle-modulated light via a detection module having one or more light detectors. In some embodiments, the subject detection module is a modular unit in which multiple detectors are co-located. Any convenient detector for detecting collected light may be employed in the detection module. In some embodiments, the subject detection module is configured to demultiplex signals associated with received particle-modulated light. Where the particle-modulated light includes side-scattered light, methods may include detecting the side-scattered light with a side-scattered light detector. The number of side-scattered light detectors in the subject methods may vary, as desired. For example, the subject methods may involve 1 side-scattered light detector or multiple side-scattered light detectors, such as 2 or more, such as 3 or more, such as 4 or more, and including 5 or more. In certain embodiments, methods include 1 side-scattered light detector. In other embodiments, methods include 2 side-scattered light detectors.

Where the particle-modulated light includes fluorescent light, methods may include detecting the fluorescent light with a fluorescent light detector. The number of fluorescent light detectors in the subject methods may vary, as desired. For example, the subject methods may involve 1 fluorescent or multiple side-scattered light detectors, such as 2 or more, such as 3 or more, such as 4 or more, such as 5 or more, such as 6 or more, such as 7 or more, such as 8 or more, such as 9 or more and including 10 or more. In certain embodiments, methods include 3 fluorescent light detectors. In other embodiments, methods include 6 fluorescent light detectors.

In embodiments, methods include detecting forward-scattered light with a forward-scatter detector. The number of forward-scatter detectors in the subject methods may vary, as desired. For example, the subject methods may involve 1 forward-scatter detector or multiple forward-scatter detectors, such as 2 or more, such as 3 or more, such as 4 or more, and including 5 or more. In certain embodiments, methods include 1 forward-scatter detector. In other embodiments, methods include 2 forward-scatter detectors.

In embodiments, the light detector is configured to measure light continuously or in discrete intervals. In some instances, detectors of interest are configured to take measurements of the collected light continuously. In other instances, detectors of interest are configured to take measurements in discrete intervals, such as measuring light every 0.001 millisecond, every 0.01 millisecond, every 0.1 millisecond, every 1 millisecond, every 10 milliseconds, every 100 milliseconds and including every 1000 milliseconds, or some other interval.

Methods of Assembling a Flow Cytometer

As discussed above, methods for assembling a flow cytometer are also provided. In embodiments, methods include positioning a fiber optic light collector (e.g., such as those described above) within a flow cytometer. In addition, methods include optically aligning the fiber optic light collector and the core stream such that particle-modulated light is collected. In embodiments, optically aligning the fiber optic light collector and core stream includes arranging the elements adjacently to one another such that an optimal amount of light emitting from irradiated particles passing through the core stream is collected and conveyed by the fiber optic light collector. The subject fiber optic light collector may be separated from the flow cell and core stream by any convenient distance. In some embodiments, the fiber optic light collector is separated from the flow cell by a distance ranging from 5 mm to 300 mm, such as 10 mm to 200 mm. In embodiments, optically aligned fiber optic light collectors and core streams are arranged such that the opposing edges of the collection surface are perpendicular and/or parallel with respect to the axis along which particles are transported within the core stream, as appropriate.

In some embodiments, methods also include positioning an objective lens between the flow cell and the fiber optic light collector. Objective lenses of interest are configured to focus particle-modulated light from the core stream (e.g., to facilitate detection). In additional embodiments, methods further include positioning a refractive optical element between the objective lens and the fiber optic light collector. Refractive optical elements of interest are configured to direct objective lens focused light onto the collection surface of the fiber optic light collector. In certain cases, the refractive optical element is a prism.

Where flow cytometers include a plurality of lasers, methods according to certain embodiments involve optically aligning a fiber optic light conveyor to each of the plurality of lasers. In embodiments, the fiber optic light conveyor is configured to convey light from each of the plurality of lasers to the flow cell so that the particles passing therethrough are irradiated. In certain cases, methods include optically aligning a single fiber optic light conveyor to the plurality of lasers and optically aligning a single fiber optic light collector to the core stream.

In some embodiments, methods further include operably connecting a detection module to the fiber optic light collector. In certain cases, the detection module includes one or more fluorescent light detectors, side-scattered light detectors and fluorescent light detectors. In some cases, the detection module is configured to demultiplex light collected by the fiber optic light collector.

Computer-Controlled Systems

Aspects of the present disclosure further include computer-controlled systems, where the systems further include one or more computers for complete automation or partial automation. In some embodiments, systems include a computer having a computer readable storage medium with a computer program stored thereon, where the computer program when loaded on the computer includes instructions for processing flow cytometer data collected by a flow cytometer that includes a flow cell configured to transport particles in a flow stream, a light source configured to produce a beam for irradiating the particles in the core stream and a fiber optic light collector for receiving particle-modulated light from the irradiated particles and conveying collected light to a detector, where the fiber optic light collector is optically aligned to the core stream and includes a collection surface having opposing edges running parallel to the direction of the core stream.

In embodiments, the system includes an input module, a processing module and an output module. The subject systems may include both hardware and software components, where the hardware components may take the form of one or more platforms, e.g., in the form of servers, such that the functional elements, i.e., those elements of the system that carry out specific tasks (such as managing input and output of information, processing information, etc.) of the system may be carried out by the execution of software applications on and across the one or more computer platforms represented of the system.

Systems may include a display and operator input device. Operator input devices may, for example, be a keyboard, mouse, or the like. The processing module includes a processor which has access to a memory having instructions stored thereon for performing the steps of the subject methods. The processing module may include an operating system, a graphical user interface (GUI) controller, a system memory, memory storage devices, and input-output controllers, cache memory, a data backup unit, and many other devices. The processor may be a commercially available processor or it may be one of other processors that are or will become available. The processor executes the operating system and the operating system interfaces with firmware and hardware in a well-known manner, and facilitates the processor in coordinating and executing the functions of various computer programs that may be written in a variety of programming languages, such as Java, Perl, C++, Python and other high level or low level languages, as well as combinations thereof, as is known in the art. The operating system, typically in cooperation with the processor, coordinates and executes functions of the other components of the computer. In some embodiments, the subject computer programs include flow cytometer data analysis software, such as FlowJo®. The operating system also provides scheduling, input-output control, file and data management, memory management, and communication control and related services, all in accordance with known techniques. The processor may be any suitable analog or digital system. In some embodiments, processors include analog electronics which allows the user to manually align a light source with the flow stream based on the first and second light signals. In some embodiments, the processor includes analog electronics which provide feedback control, such as for example negative feedback control.

The system memory may be any of a variety of known or future memory storage devices. Examples include any commonly available random access memory (RAM), magnetic medium such as a resident hard disk or tape, an optical medium such as a read and write compact disc, flash memory devices, or other memory storage device. The memory storage device may be any of a variety of known or future devices, including a compact disk drive, a tape drive, or a diskette drive. Such types of memory storage devices typically read from, and/or write to, a program storage medium (not shown) such as a compact disk. Any of these program storage media, or others now in use or that may later be developed, may be considered a computer program product. As will be appreciated, these program storage media typically store a computer software program and/or data. Computer software programs, also called computer control logic, typically are stored in system memory and/or the program storage device used in conjunction with the memory storage device.

In some embodiments, a computer program product is described comprising a computer usable medium having control logic (computer software program, including program code) stored therein. The control logic, when executed by the processor the computer, causes the processor to perform functions described herein. In other embodiments, some functions are implemented primarily in hardware using, for example, a hardware state machine. Implementation of the hardware state machine so as to perform the functions described herein will be apparent to those skilled in the relevant arts.

Memory may be any suitable device in which the processor can store and retrieve data, such as magnetic, optical, or solid-state storage devices (including magnetic or optical disks or tape or RAM, or any other suitable device, either fixed or portable). The processor may include a general-purpose digital microprocessor suitably programmed from a computer readable medium carrying necessary program code. Programming can be provided remotely to processor through a communication channel, or previously saved in a computer program product such as memory or some other portable or fixed computer readable storage medium using any of those devices in connection with memory. For example, a magnetic or optical disk may carry the programming, and can be read by a disk writer/reader. Systems of the invention also include programming, e.g., in the form of computer program products, algorithms for use in practicing the methods as described above. Programming according to the present invention can be recorded on computer readable media, e.g., any medium that can be read and accessed directly by a computer. Such media include, but are not limited to: optical storage media such as CD-ROM; electrical storage media such as RAM and ROM; portable flash drive; and hybrids of these categories such as magnetic/optical storage media.

The processor may also have access to a communication channel to communicate with a user at a remote location. By remote location is meant the user is not directly in contact with the system and relays input information to an input manager from an external device, such as a computer connected to a Wide Area Network ("WAN"), telephone network, satellite network, or any other suitable communication channel, including a mobile telephone (i.e., smartphone).

In some embodiments, systems according to the present disclosure may be configured to include a communication interface. In some embodiments, the communication interface includes a receiver and/or transmitter for communicating with a network and/or another device. The communication interface can be configured for wired or wireless communication, including, but not limited to, radio frequency (RF) communication (e.g., Radio-Frequency Identification (RFID), Zigbee communication protocols, WiFi, infrared, wireless Universal Serial Bus (USB), Ultra Wide Band (UWB), Bluetooth® communication protocols, and cellular communication, such as code division multiple access (CDMA) or Global System for Mobile communications (GSM).

In one embodiment, the communication interface is configured to include one or more communication ports, e.g., physical ports or interfaces such as a USB port, an RS-232 port, or any other suitable electrical connection port to allow data communication between the subject systems and other external devices such as a computer terminal (for example, at a physician's office or in hospital environment) that is configured for similar complementary data communication.

In one embodiment, the communication interface is configured for infrared communication, Bluetooth® communication, or any other suitable wireless communication protocol to enable the subject systems to communicate with other devices such as computer terminals and/or networks, communication enabled mobile telephones, personal digital assistants, or any other communication devices which the user may use in conjunction.

In one embodiment, the communication interface is configured to provide a connection for data transfer utilizing Internet Protocol (IP) through a cell phone network, Short Message Service (SMS), wireless connection to a personal computer (PC) on a Local Area Network (LAN) which is connected to the internet, or WiFi connection to the internet at a WiFi hotspot.

In one embodiment, the subject systems are configured to wirelessly communicate with a server device via the communication interface, e.g., using a common standard such as 802.11 or Bluetooth® RF protocol, or an IrDA infrared protocol. The server device may be another portable device, such as a smart phone, Personal Digital Assistant (PDA) or notebook computer; or a larger device such as a desktop computer, appliance, etc. In some embodiments, the server device has a display, such as a liquid crystal display (LCD), as well as an input device, such as buttons, a keyboard, mouse or touch-screen.

In some embodiments, the communication interface is configured to automatically or semi-automatically communicate data stored in the subject systems, e.g., in an optional data storage unit, with a network or server device using one or more of the communication protocols and/or mechanisms described above.

Output controllers may include controllers for any of a variety of known display devices for presenting information to a user, whether a human or a machine, whether local or remote. If one of the display devices provides visual information, this information typically may be logically and/or physically organized as an array of picture elements. A graphical user interface (GUI) controller may include any of a variety of known or future software programs for providing graphical input and output interfaces between the system and a user, and for processing user inputs. The functional elements of the computer may communicate with each other via system bus. Some of these communications may be accomplished in alternative embodiments using network or other types of remote communications. The output manager may also provide information generated by the processing module to a user at a remote location, e.g., over the Internet, phone or satellite network, in accordance with known techniques. The presentation of data by the output manager may be implemented in accordance with a variety of known techniques. As some examples, data may include SQL, HTML or XML documents, email or other files, or data in other forms. The data may include Internet URL addresses so that a user may retrieve additional SQL, HTML, XML, or other documents or data from remote sources. The one or more platforms present in the subject systems may be any type of known computer platform or a type to be developed in the future, although they typically will be of a class of computer commonly referred to as servers. However, they may also be a main-frame computer, a workstation, or other computer type. They may be connected via any known or future type of cabling or other communication system including wireless systems, either networked or otherwise. They may be co-located or they may be physically separated. Various operating systems may be employed on any of the computer platforms, possibly depending on the type and/or make of computer platform chosen. Appropriate operating systems include Windows NT®, Windows XP, Windows 7, Windows 8, Windows 10, iOS, macOS, Linux, OS/400, Android, SGI IRIX, Siemens Reliant Unix, and others.

Figure 7:
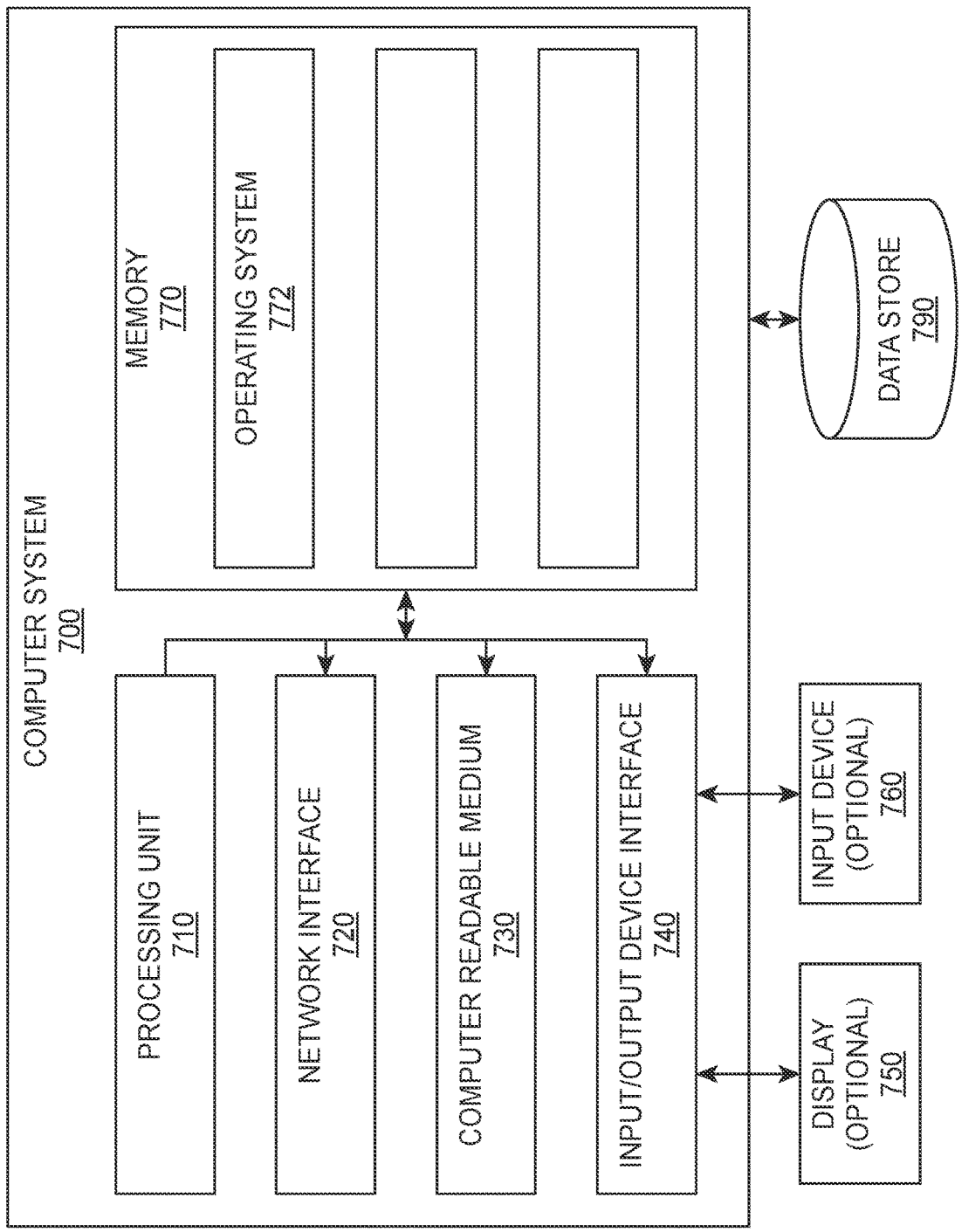
FIG. 7 depicts a block diagram of a computing system according to certain embodiments.

FIG. 7 depicts a general architecture of an example computing device 700 according to some embodiments. The general architecture of the computing device 700 depicted in FIG. 7 includes an arrangement of computer hardware and software components. The computing device 700 may include many more (or fewer) elements than those shown in FIG. 7. It is not necessary, however, that all of these generally conventional elements be shown in order to provide an enabling disclosure. As illustrated, the computing device 700 includes a processing unit 710, a network interface 720, a computer readable medium drive 730, an input/output device interface 740, a display 750, and an input device 760, all of which may communicate with one another by way of a communication bus. The network interface 720 may provide connectivity to one or more networks or computing systems. The processing unit 710 may thus receive information and instructions from other computing systems or services via a network. The processing unit 710 may also communicate to and from memory 770 and data store 790 and further provide output information for an optional display 750 via the input/output device interface 740. The input/output device interface 740 may also accept input from the optional input device 760, such as a keyboard, mouse, digital pen, microphone, touch screen, gesture recognition system, voice recognition system, gamepad, accelerometer, gyroscope, or other input device.

The memory 770 may contain computer program instructions (grouped as modules or components in some embodiments) that the processing unit 710 executes in order to implement one or more embodiments. The memory 770 generally includes RAM, ROM and/or other persistent, auxiliary or non-transitory computer-readable media. The memory 770 may store an operating system 772 that provides computer program instructions for use by the processing unit 710 in the general administration and operation of the computing device 700. The memory 770 may further include computer program instructions and other information for implementing aspects of the present disclosure.

Utility

The subject flow cytometers and methods find use in a variety of applications where it is desirable to increase resolution and accuracy in the determination of parameters for particles in a biological sample. For example, the present disclosure finds use in accurately determining parameters regarding particle morphology such as diameter as well as surface and internal structure of the particle. Flow cytometers and methods of the present disclosure may also be employed where it is desirable to include a plurality of multiplexed lasers for irradiating a sample in a core stream. In embodiments, the flow cytometers and methods involving the fiber optic light collector described herein result in increased light collection and improved fluidic tolerances, thereby increasing the number of lasers that may be aligned to a single fiber. As such, flow cytometers and methods described herein may be used to increase the amount of particle-modulated light detected by the system. Aspects of the present disclosure may further be used where it is desirable to reduce the size, complexity and operational costs associated with flow cytometry by, e.g., multiplexing multiple lasers and collecting particle-modulated light via a single fiber optic light collector. In embodiments, the present disclosure reduces the need for user input or manual adjustment during sample analysis with a flow cytometer. In some embodiments, the subject methods and systems provide fully automated protocols so that adjustments to flow cytometer data during use require little, if any, human input.

The present disclosure can be employed to characterize many types of analytes, in particular, analytes relevant to medical diagnosis or protocols for caring for a patient, including but not limited to: proteins (including both free proteins and proteins and proteins bound to the surface of a structure, such as a cell), nucleic acids, viral particles, and the like. Further, samples can be from in vitro or in vivo sources, and samples can be diagnostic samples.

Kits

Kits including one or more components of the subject flow cytometers are also provided. Kits according to certain embodiments of the invention include one or more fiber optic light collectors for receiving particle-modulated light from irradiated particles in a core stream and conveying the collected light to a detector. As discussed above, fiber optic light collectors of interest include a collection surface having opposing edges running parallel to the direction of the core stream. In addition, kits may include one or more objective lenses for focusing particle-modulated light emitting from the core stream of the flow cell. In some embodiments, kits further include one or more refractive optical elements for directing objective lens focused light onto the collection surface of a fiber optic light collector. In certain cases, the refractive optical element included in the subject kits is a prism. Kits may also include one or more fiber optic light conveyors configured to convey light from each of the plurality of lasers to the flow cell. Kits according to some embodiments may also include a detection module having one or more fluorescent light detectors, side-scattered light detectors and forward-scattered light detectors. The various components of the kits may be present in separate containers, or some or all of them may be pre-combined/assembled.

In addition to the above components, the subject kits may further include (in some embodiments) instructions, e.g., for adding above components to a flow cytometer or using a flow cytometer having a light collection enhancer according to aspects of the subject invention. These instructions may be present in the subject kits in a variety of forms, one or more of which may be present in the kit. One form in which these instructions may be present is as printed information on a suitable medium or substrate, e.g., a piece or pieces of paper on which the information is printed, in the packaging of the kit, in a package insert, and the like. Yet another form of these instructions is a computer readable medium, e.g., diskette, compact disk (CD), portable flash drive, and the like, on which the information has been recorded. Yet another form of these instructions that may be present is a website address which may be used via the internet to access the information at a removed site.

Although the foregoing invention has been described in some detail by way of illustration and example for purposes of clarity of understanding, it is readily apparent to those of ordinary skill in the art in light of the teachings of this invention that some changes and modifications may be made thereto without departing from the spirit or scope of the appended claims.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. Moreover, nothing disclosed herein is intended to be dedicated to the public regardless of whether such disclosure is explicitly recited in the claims.

The scope of the present invention, therefore, is not intended to be limited to the exemplary embodiments shown and described herein. Rather, the scope and spirit of present invention is embodied by the appended claims. In the claims, 35 U.S.C. § 112(f) or 35 U.S.C. § 112(6) is expressly defined as being invoked for a limitation in the claim only when the exact phrase "means for" or the exact phrase "step for" is recited at the beginning of such limitation in the claim; if such exact phrase is not used in a limitation in the claim, then 35 U.S.C. § 112 (f) or 35 U.S.C. § 112(6) is not invoked.

What is claimed is:

1. A flow cytometer comprising:
    a flow cell configured to transport particles in a core stream;
    multiple spatially separated lasers configured to irradiate the particles in the core stream with multiplexed beams; and
    a fiber optic light collector for receiving particle-modulated light from the irradiated particles and conveying collected light to a detector, wherein the fiber optic light collector is optically aligned to the core stream and comprises a collection surface having opposing edges running parallel to the direction of the core stream.

2. The flow cytometer according to claim 1, wherein the collection surface of the fiber optic light collector is rectangular.

3. The flow cytometer according to claim 2, wherein the collection surface of the fiber optic light collector is square.

4. The flow cytometer according to claim 1, further comprising an objective lens positioned between the flow cell and the fiber optic light collector, wherein the objective lens is configured to focus particle-modulated light from the core stream.

5. The flow cytometer according to claim 4, further comprising a refractive optical element positioned between the objective lens and the and the fiber optic light collector, wherein the refractive optical element is configured to direct objective lens focused light onto the collection surface of the fiber optic light collector.

6. The flow cytometer according to claim 5, wherein the refractive optical element is a prism.

7. The flow cytometer according to claim 1, further comprising a fiber optic light conveyor configured to convey light from each of the multiple lasers to the flow cell.

8. The flow cytometer according to claim 7, comprising a single fiber optic light conveyor and a single fiber optic light collector.

9. The flow cytometer according to claim 8, wherein the single fiber optic light conveyor is configured to convey multiplexed beams from the multiple lasers to the flow cell.

10. The flow cytometer according to claim 1, further comprising a detection module operably connected to the fiber optic light collector, wherein the detection module comprises a detector.

11. The flow cytometer according to claim 10, wherein the detection module is configured to demultiplex light collected by the fiber optic light collector.

12. The flow cytometer according to claim 10, wherein the detection module comprises a plurality of detectors operably connected to the fiber optic light collector.

13. A method of analyzing a sample, the method comprising:
(a) introducing the sample into a flow cytometer comprising:
a flow cell configured to transport particles in a core stream;
multiple spatially separated lasers configured to irradiate the particles in the core stream with multiplexed beams; and
a fiber optic light collector for receiving particle-modulated light from the irradiated particles and conveying collected light to a detector, wherein the fiber optic light collector is optically aligned to the core stream and comprises a collection surface having opposing edges running parallel to the direction of the core stream; and
(b) detecting particle-modulated light collected by the fiber optic light collector to analyze the sample.

14. The method according to claim 13, wherein the collection surface of the fiber optic light collector is rectangular.

15. The method according to claim 14, wherein the collection surface of the fiber optic light collector is square.

16. A method of assembling a flow cytometer, the method comprising:
(a) positioning a fiber optic light collector within a flow cytometer, wherein:
the flow cytometer comprises:
a flow cell configured to transport particles in a core stream; and
multiple spatially separated lasers configured to irradiate the particles in the core stream with multiplexed beams; and
the fiber optic light collector is configured to receive particle-modulated light from the irradiated particles and convey collected light to a detector, wherein the fiber optic light collector comprises a collection surface having opposing edges running parallel to the direction of the core stream; and
(b) optically aligning the fiber optic light collector and the core stream such that particle-modulated light is collected.

17. The method according to claim 16, wherein the collection surface of the fiber optic light collector is rectangular.

18. The method according to claim 17, wherein the collection surface of the fiber optic light collector is square.

* * * * *